United States Patent
Kamon

(10) Patent No.: US 7,149,168 B2
(45) Date of Patent: Dec. 12, 2006

(54) METHOD AND APPARATUS FOR CONTROLLING THE INTENSITY OF A LASER BEAM USED TO RECORD/REPRODUCE DATA TO/FROM AN OPTICAL DISC

(75) Inventor: Hidekazu Kamon, Kanagawa (JP)

(73) Assignee: Sony Corporation, Tokyo (JP)

( * ) Notice: Subject to any disclaimer, the term of this patent is extended or adjusted under 35 U.S.C. 154(b) by 567 days.

(21) Appl. No.: 10/624,818

(22) Filed: Jul. 23, 2003

(65) Prior Publication Data

US 2004/0141446 A1 Jul. 22, 2004

(30) Foreign Application Priority Data

Jul. 31, 2002 (JP) .............................. 2002-223990

(51) Int. Cl.
*G11B 7/12* (2006.01)

(52) U.S. Cl. .................................. 369/47.53; 369/53.36

(58) Field of Classification Search ..................... None
See application file for complete search history.

(56) References Cited

U.S. PATENT DOCUMENTS

| 5,255,007 | A | * | 10/1993 | Bakx | 347/247 |
| 5,422,890 | A | * | 6/1995 | Klingsporn et al. | 714/723 |
| 5,471,457 | A | * | 11/1995 | Bakx et al. | 369/47.53 |
| 5,550,799 | A | * | 8/1996 | Inoue et al. | 369/116 |
| 5,841,747 | A | * | 11/1998 | Kubota et al. | 369/47.52 |
| 6,912,188 | B1 | * | 6/2005 | Morishima | 369/47.53 |

* cited by examiner

*Primary Examiner*—William Korzuch
*Assistant Examiner*—Christopher Lamb
(74) *Attorney, Agent, or Firm*—Oblon, Spivak, McClelland, Maier & Neustadt, P.C.

(57) ABSTRACT

A recording/reproducing apparatus is disclosed which records and reproduces data to and from an optical disc using a laser beam. In accordance with an error rate detected from the data that have been recorded and reproduced to and from the optical disc, the apparatus controls the intensity of the laser beam in order to ensure error-free recording of the data.

17 Claims, 20 Drawing Sheets

FIG. 12 ctype/response

| | | |
|---|---|---|
| Command | 0000 | CONTROL |
| | 0001 | STATUS |
| | 0010 | INQUIRY |
| | 0011 | NOTIFY |
| | 0100 ≀ 0111 | (reserved) |
| Response | 1000 | NOT IMPLEMENTED |
| | 1001 | ACCEPTED |
| | 1010 | REJENTED |
| | 1011 | IN TRANSITION |
| | 1100 | IMPLEMENTED/STABLE |
| | 1101 | CHANGED |
| | 1110 | (reserved) |
| | 1111 | INTERIM |

FIG. 13A

| subunit_type | |
|---|---|
| 00000 | Monitor |
| (reserved) | |
| 00011 | Disc recorder/player |
| 00100 | VCR |
| 00101 | Tuner |
| 00111 | Camera |
| ~ | (reserved) |
| 11111 | Unit* |

FIG. 13B

| opcode | Operation Code |
|---|---|
| 00h | VENDOR-DEPENDENT |
| 50h | SEACH MODE |
| 52h | ATN |
| 60h | OPEN MIC |
| 61h | READ MIC |
| 62h | WRITE MIC |
| C1h | LOAD MEDIUM |
| C2h | RECORD |
| C3h | PLAY |
| C4h | WIND |
| ~ | ~ |

* EACH SUBUNIT IS PROVIDED WITH AN OPCODE TABLE
* OPERANDS ARE DEFINED FOR EACH OPCODE

FIG. 17

GET_MAINTENANCE_INFO

| | contents | | | | | | value |
|---|---|---|---|---|---|---|---|
| | msb | | | | | lsb | |
| | CTS (0h) | | | Ctype (1h) | | | 01h |
| | subunit_type (11h) | | | | subunit ID (0h) | | 18h |
| OpCode | VENDER_DEPENDENT | | | | | | 00h |
| Operand[0] | Company ID | | | | | | 08h |
| Operand[1] | | | | | | | 00h |
| Operand[2] | | | | | | | 46h |
| Operand[3] | Level | | | | | | F0h |
| Operand[4] | Product code | | | | | | 03h |
| Operand[5] | | | | | | | 01h |
| Operand[6] | Application code | | | | | | 02h |
| Operand[7] | Opcode (GET_MAINTENANCE_INFO) | | | | | | 30h |
| Operand[8] | Total_rec (H) | | | | | | FFh |
| Operand[9] | Total_rec (L) | | | | | | FFh |
| Operand[10] | Viop_ref (H) | | | | | | FFh |
| Operand[11] | Viop_ref (L) | | | | | | FFh |
| Operand[12] | Viop (H) | | | | | | FFh |
| Operand[13] | Viop (L) | | | | | | FFh |
| Operand[14] | Temperature (H) | | | | | | FFh |
| Operand[15] | Temperature (L) | | | | | | FFh |
| Operand[16] | Voltage (H) | | | | | | FFh |
| Operand[17] | Voltage (L) | | | | | | FFh |
| Operand[18] | Download_count[Request] (H) | | | | | | FFh |
| Operand[19] | Download_count[Request] (L) | | | | | | FFh |
| Operand[20] | Download_count[Done] (H) | | | | | | FFh |
| Operand[21] | Download_count[Done] (L) | | | | | | FFh |
| Operand[22] | Download_count[Cancel] (H) | | | | | | FFh |
| Operand[23] | Download_count[Cancel] (L) | | | | | | FFh |
| Operand[24] | Interrupt_Register[7-0] | | | | | | FFh |
| Operand[25] | emb_flag2[7-0] | | | | | | FFh |
| Operand[26] | state_flag2[7-0] | | | | | | FFh |
| Operand[27] | retry_status_disp[7-0] | | | | | | FFh |
| Operand[28] | rec_retry_count_sum | | | | | | FFh |
| Operand[29] | Serial_number (H) | | | | | | FFh |
| Operand[30] | Serial_number (L) | | | | | | FFh |
| Operand[31] | Version_number (H) | | | | | | FFh |
| Operand[32] | Version_number (L) | | | | | | FFh |
| Operand[33] | rror_rate (H) | | | | | | FFh |
| Operand[34] | error_rate (L) | | | | | | FFh |

Command: 01 18 00 08 00 46 F0 03 01 02 30 FF FF FF FF FF
FF FF FF FF FF FF FF FF FF FF FF FF FF FF FF FF
FF FF FF FF FF FF Length=38

F I G. 19
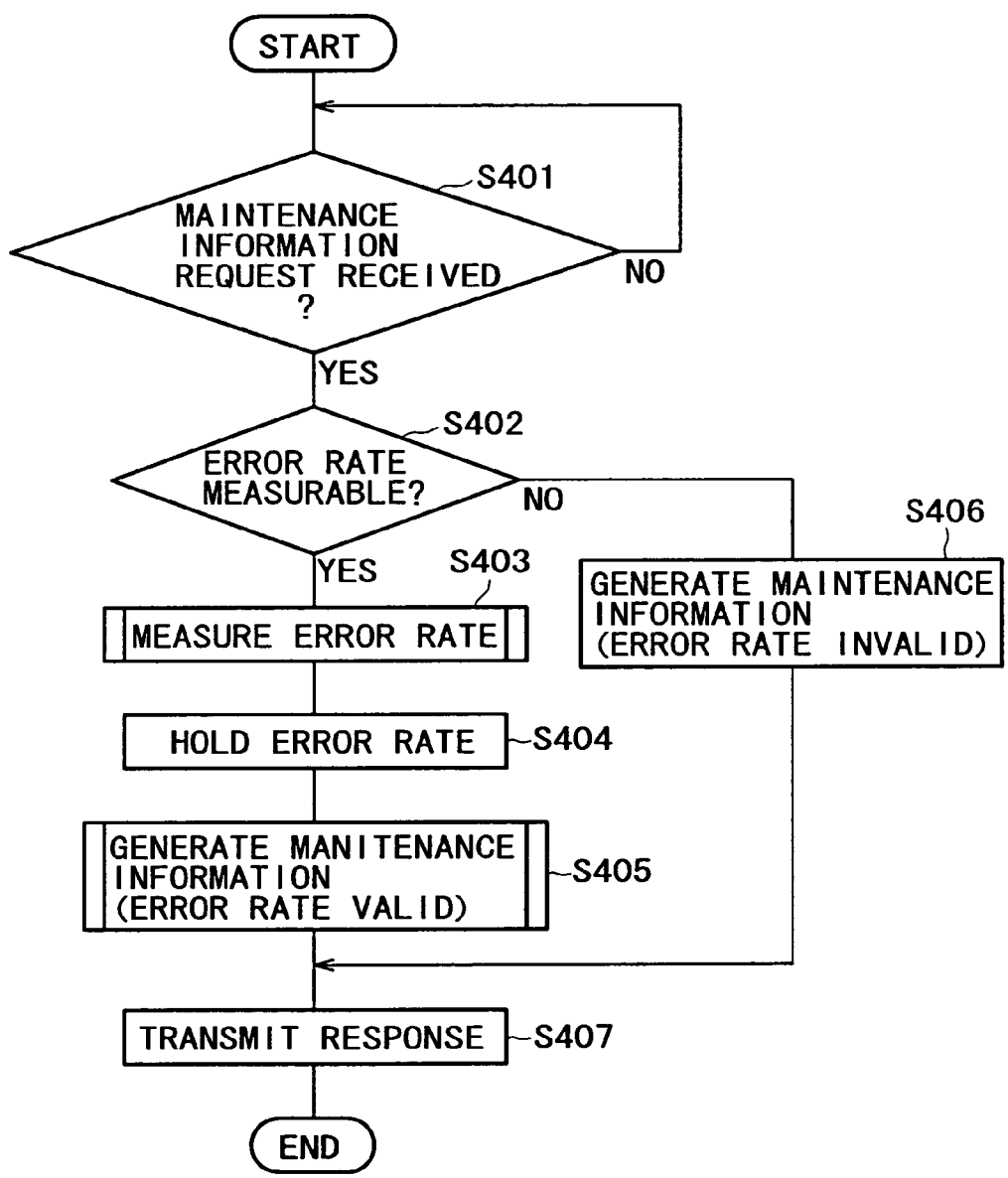

METHOD AND APPARATUS FOR CONTROLLING THE INTENSITY OF A LASER BEAM USED TO RECORD/REPRODUCE DATA TO/FROM AN OPTICAL DISC

BACKGROUND OF THE INVENTION

The present invention relates to a recording/reproducing apparatus and a recording/reproducing method for recording and reproducing data to and from an optical disc in accordance with an error rate being measured.

Today, public terminals are set up in convenience stores, amusement arcades, railway station premises and other public locations in order to provide a variety of services. Each of these public terminals is connected to various servers corresponding to the services being offered, such as distribution of music data, sale of show business tickets and other products, and printing of picture data picked up by users' digital cameras.

Under a typical service scheme, a user (i.e., customer) may wish to purchase music data through the use of a public terminal capable of offering a music distribution service. In such a case, the user may illustratively take to the public terminal a storage medium compatible with the terminal, load the storage medium through a slot into the terminal, select a desired tune to be purchased by making appropriate operations on a screen of the terminal while watching guiding images on display, specify the way the payment is to be made (e.g., cash, credit card, or ATM card), and get the music data recorded to the storage medium brought in for the purpose.

The public terminal includes among others a recording apparatus for recording data to a loaded storage medium, and a hard disc drive or the like that stores music data constituting a plurality of tunes offered to customers within the framework of the service. In operation, the public terminal retrieves the music data selected by the user from the hard disc drive, causes the recording apparatus to write the selected data to the storage medium brought in by the user, and ejects the data-recorded medium out of the terminal through the slot.

Because the public terminals are set up in convenience stores, amusement arcades, railway station premises and other well-trafficked locations as mentioned above, these terminals are liable to develop irregularities due to airborne dust or other ambient contamination. Since it is virtually impossible for administrators to stand by and monitor each terminal, a failed terminal cannot be serviced immediately.

In view of such eventualities, this applicant has submitted a patent application (Japanese Patent Application No. 2000-302861) disclosing a structure for dealing with troubles within a recording apparatus more efficiently in the public terminal.

The above patent application shows illustratively that the recording apparatus is structured to collect various pieces of maintenance information regarding the failed status inside the apparatus. The maintenance information is acquired in a suitably timed manner by the public terminal from the recording apparatus and transmitted to a control center connected through a communication network.

By analyzing the transmitted maintenance information, the control center can readily localize any failure that may occur in the recording apparatus and identify the type of the failure. If the recording apparatus is found free of fault but the trouble persists, the control center is able to localize the failure somewhere other than the recording apparatus inside the terminal. Where the recording apparatus is compatible with optical discs, the maintenance information may include the accumulated use time and the output level of a semiconductor laser used in an optical pickup of the apparatus. The maintenance information may also contain information indicative of a level of deterioration in performance in proportion to the used time of the semiconductor laser. These pieces of information allow the control center to take preventive measures against possible failures of the recording apparatus. Such measures include illustratively a decision on the timing of replacing particular parts in the apparatus.

At present, however, there can still occur write errors during the recording of data to the storage medium loaded in the recording apparatus despite the apparent absence of any failure as determined from the details of such maintenance information. One probable cause of such errors is the presence of dirt, dust or other contamination on the disc surface. More specifically, if the recording apparatus handles optical discs and if an optical disc brought in by a customer (i.e., user) and loaded into the recording apparatus has a higher level of contamination than tolerated on the surface, the recording apparatus with its optical pickup may perform a data write operation normally but the contamination may still trigger a write error resulting in failed data recording. It might also happen that a greater-than-tolerable amount of dust, dirt or other foreign matters somehow infiltrating into the recording apparatus sticks to the objective lens of the optical pickup and distorts the laser beam emitted through the lens to the signal surface of the disc. This is another probable cause of write errors.

The above-mentioned maintenance information contains information about the operations carried out by hardware or by software in the recording apparatus, including a write and/or read retry count regarding each disc handled. Illustratively, referencing the retry count information makes it possible to determine whether an out-of-tolerance level of contamination exists in the recording apparatus.

However, with such remote fault diagnosis performed correctly, write errors on the storage medium may already have occurred with a relatively high frequency while the public terminal has been operating. Analyzing the maintenance information signifies checking the results subsequent to write errors, not before. In other words, it is very difficult directly to predict and prevent write errors attributable to the presence of ambient dirt or other contamination.

A typical storage medium is a disc cartridge containing an erasable magneto-optical disc $90a$. The magneto-optical disc $90a$ held in the disc cartridge is designed to have music data recorded to its program area. Radially inside the program area is a control area in which is recorded control information (known as the Table of Contents or TOC) for controlling the music data written to the program area. The TOC is updated every time the program area is renewed such as when new music data are written thereto. If a write error disrupts a correct update of the TOC, unlinking can occur between the control area and the music data, which makes it impossible to reproduce all music data that have been preserved by the user on the disc cartridge.

SUMMARY OF THE INVENTION

Under these circumstances, an object of the present invention is to provide a recording/reproducing apparatus and a recording/reproducing method for reliably recording and reproducing data to and from an optical disc from the time an administrator finds it necessary to maintain the apparatus based on maintenance information, until the maintenance actually starts being conducted.

In carrying out the invention and according to one aspect thereof, there is provided a recording/reproducing apparatus for recording and reproducing data to and from an optical disc being loaded, the recording/reproducing apparatus including: a recording/reproducing element for recording and reproducing data to and from the optical disc by emitting a laser beam to recording tracks on the loaded optical disc; a transporting element for transporting the recording/reproducing element to a relevant recording track on the optical disc; an error rate detecting element for detecting an error rate of the data reproduced from the optical disc; and a laser beam intensity controlling element for controlling in intensity the laser beam emitted to the optical disc in accordance with the error rate resulting from the detection by the error rate detecting element.

According to another aspect of the invention, there is provided a recording/reproducing apparatus for recording and reproducing data to and from an optical disc being loaded, the recording/reproducing apparatus including: an optical disc loading/ejecting element for transporting the optical disc between a first position in which the data are record and reproduced to and from the optical disc, and a second position in which the optical disc is ejected; a recording/reproducing element for recording and reproducing the data by emitting a laser beam to a recording track on the optical disc; a transporting element for transporting the recording/reproducing element in such a manner that the laser beam is emitted to a relevant recording track on the optical disc; an error rate measuring element for measuring an error rate of the data reproduced by the recording/reproducing element; a laser beam intensity controlling element for controlling in intensity the laser beam emitted to the optical disc; and a controlling element for causing the error rate measuring element to measure the error rate of the data read by the recording/reproducing element from the optical disc loaded by the optical disc loading/ejecting element, the controlling element further causing the laser beam intensity controlling element to change the intensity of the laser beam in accordance with the error rate resulting from the measurement by the error rate measuring element.

According to a further aspect of the invention, there is provided a recording/reproducing method for recording and reproducing data to and from an optical disc, the recording/reproducing method including the steps of: transporting an optical head to a relevant recording track on the optical disc so that the optical head may emit a laser beam to the recording track; recording relevant data to the recording track to which the optical head has been transported; reproducing the recorded relevant data; measuring an error rate of the reproduced data; and controlling in intensity the laser beam emitted to the optical disc at a time of recording in accordance with the measured error rate.

Other objects, features and advantages of the invention will become more apparent upon a reading of the following description and appended drawings.

BRIEF DESCRIPTION OF THE DRAWINGS

FIG. 12 is an explanatory view of ctype/response definitions for the asynchronous packet;

FIGS. 13A and 13B are explanatory views of subunit_type and opcode definitions for the asynchronous packet;

FIG. 17 is an explanatory view showing a typical structure of a GET_MAINTENANCE_INFO command;

FIG. 19 is a flowchart of steps in which the recording apparatus transmits a GET_MAINTENANCE_INFO response to a main processing unit.

DETAILED DESCRIPTION OF THE PREFERRED EMBODIMENTS

Described below with reference to the accompanying drawings is a public terminal embodying the invention and capable of writing to a user's storage medium the music data purchased by the user. Public terminals of this type constitute part of a service system offering customers (i.e., users) diverse services including the sale of music data. The ensuing description will be given under the following headings:

1. Configuration of the service system 1-1. Overview 1-2. Public terminals 1-3. Disc cartridge recording apparatus (MD recorder)

1-3-1. Internal structure 1-3-2. Error handling process

2. IEEE 1394 data interface 2-1. Overview 2-2. Stack model 2-3. Packets 2-4. CIP (Common Isochronous Packet)

2-5. Commands and responses stipulated by FCP 2-6. AV/C command packet

3. Write error preventing operation

Figure 1:
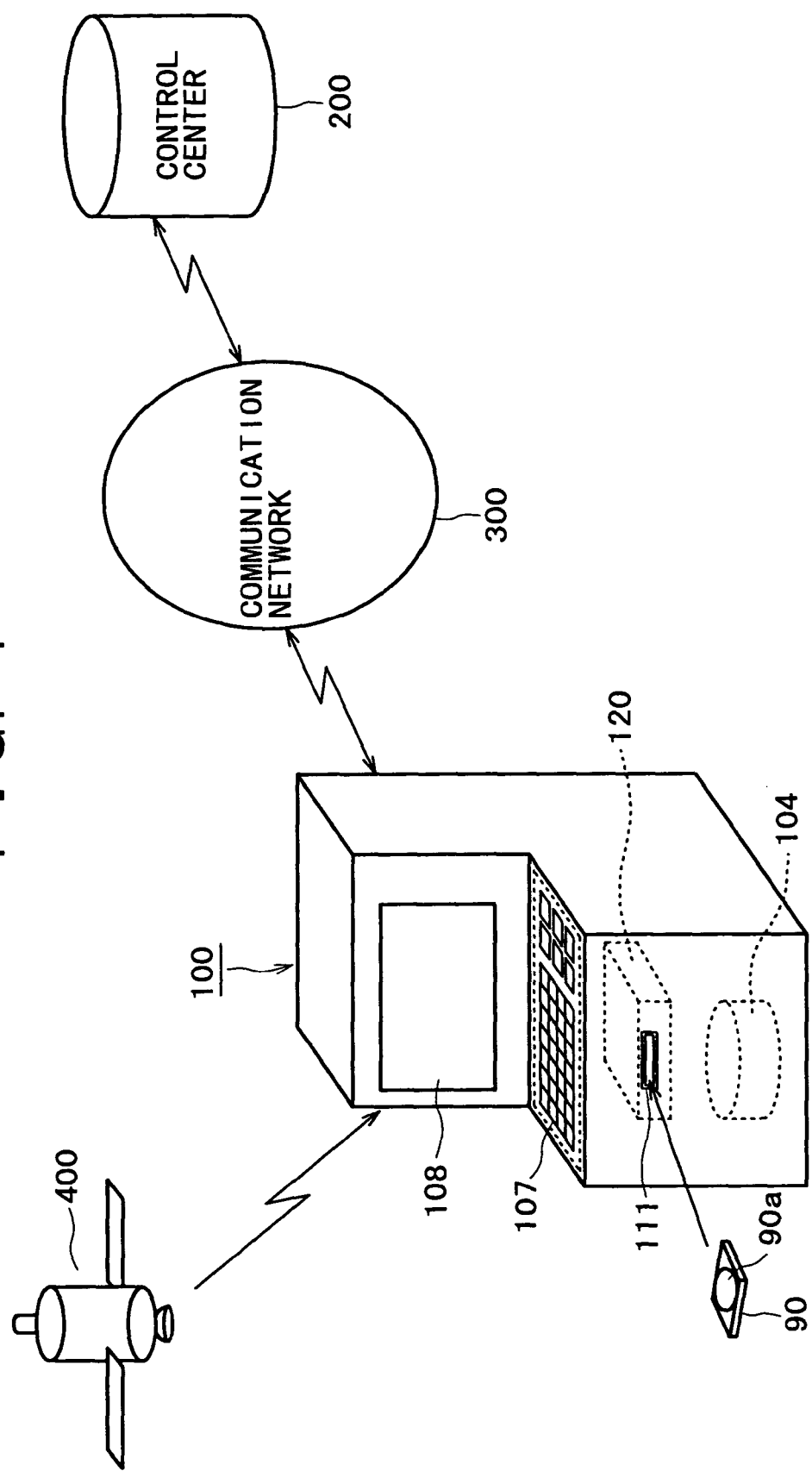
FIG. 1 is a schematic view showing a typical configuration of a service system using public terminals according to this invention.

4. Maintenance information 4-1. GET_MAINTENANCE_INFO 4-2. Maintenance information generating process 1. Configuration of the Service System 1-1. Overview FIG. 1 schematically shows a typical configuration of a service system using public terminals 100 according to this invention. In the service system, the public terminals 100 each offering a music data selling service are connected through a communication network 300 to a control center 200 that has a control server for controlling the terminals 100. The public terminals 100 are also capable of receiving radio signals from a communication satellite 400 whereby music data constituting illustratively newly released tunes can be downloaded as part of the service. The communication network 300 may be constituted, but not limited, by xDSL (x Digital Subscriber Line), WLL (Wireless Local Loop), a PHS (Personal Handyphone System) network, a mobile telephone communication network, an optical fiber communication network, a satellite communication network, ISDN (Integrated Services Digital Network), or analog telephone circuits.

A large number of public terminals 100 are set up in amusement arcades, convenience stores, railway station premises, street corners, and other well-trafficked locations in order to provide customers (i.e., users) with a variety of services such as the sale of music data. Each public terminal 100 is furnished with an operation unit 107 with keys and buttons for the user to operate, and a display unit 108 comprising a liquid-crystal display panel or a CRT that gives necessary indications to the user in response to his or her operations. In this example, the public terminals 100 are assumed to sell music data. More specifically, each public terminal 100 is designed to write user-selected music data to a user's disc cartridge 90 containing an optical disc as a storage medium. The optical disc is illustratively a writable magneto-optical disc 90a bearing a vertical magnetic film as its recording layer. Alternatively, the optical disc may be a write-once optical disc using an organic dye in its recording layer. Another alternative may be a rewritable optical disc using a phase change material in its recording layer.

The public terminal 100 includes a recording apparatus 120 that records user-selected music data to the magneto-optical disc 90a in the disc cartridge 90 brought in by the user. The enclosure of the public terminal 100 has a cartridge slot 111 through which disc cartridges are inserted and ejected.

A customer wishing to purchase music data operates the operation unit 107 first to choose from among several service options the music data selling service and then to select the music data constituting the desired tune or tunes to be purchased. After the selection, the customer (i.e., user) settles the payment in keeping with the types and the number of the selected tunes by inserting coins and/or notes into a designated slot. The payment may be settled not only in cash but also by credit card or by ATM card. By following the instructions appearing on the display unit 108 during the tune purchasing operations, the user inserts through the cartridge slot 111 his or her disc cartridge 90 to which to write music data. Alternatively, a plurality of brand-new disc cartridges 90 may be kept in stock inside the public terminal 100 so that each of the stocked cartridges is offered to each user wishing to purchase music data. When inserted through the cartridge slot 111, the disc cartridge 90 is loaded into a loading unit of the recording apparatus. The music data selected by the user are then written by the magneto-optical disc 90a housed rotatably inside the cartridge. After the music data have been written to the disc 90a, the disc cartridge 90 is ejected through the cartridge slot 111 and returned to the customer. In this manner, the user having access to the public terminal 100 is able to get desired music data purchased and written to the disc cartridge 90.

In this example, the music data offered to customers are sent to the public terminals 100 by record companies or other music data providers via the communication satellite 400. Each public terminal 100 acquires the music data by capturing radio signals from the satellite 400. Data communication links involving the communication satellite 400 are utilized here because they provide high-speed data communications allowing music data constituting a plurality of tunes to be downloaded rapidly. The music data obtained by the public terminal 100 from the satellite 400 through radio transmissions are placed into an internal storage unit 104 for storage. The storage unit 104 is illustratively a mass storage hard disc drive that accommodates music data making up a plurality of tunes offered for sale by this service. When listing purchasable music data on the display unit 108, the public terminal 100 causes the unit 108 to show a list of titles and artist names associated with the for-sale tunes held in the storage unit 104. At the time of getting the recording apparatus 120 to write music data, the public terminal 100 first retrieves the relevant music data from the storage unit 104 and transfers the retrieved data to the recording apparatus 120. In turn, the recording apparatus 120 writes the user-selected music data to the magneto-optical disc 90a in the disc cartridge 90 loaded into the loading unit.

The control center 200 has a control server that controls the public terminals 100 located in various places. Given maintenance information from the terminals 100, the control center 200 initiates maintenance activities such as replacement of or air blow for the recording apparatus 120 through those terminals deemed faulty. The control server in the control center 200 is connected through the communication network 300 to the public terminals 100. The control center 200 communicates with each terminal 100 as needed to collect maintenance information, i.e., relevant information that can be grasped about current status and possible defects of the terminal in question. The maintenance information is used as a basis for determining the timing of maintenance of each terminal. In particular, the control center 200 gathers maintenance information about the recording apparatus 120 inside each public terminal 100.

In addition to the service of offering customers music data for a fee or for free, the public terminals 100 of the inventive system may also provide such services as writing downloaded electronic data to a storage medium, selling show business tickets and other products, printing picture data picked up by users' digital cameras, and executing money deposits and withdrawals. Where any one of such additional services is to be offered, the public terminal 100 need only be furnished with equipment addressing the service in question and, if necessary, be connected via a network to servers required for implementing the service. For example, an online product marketing service may be implemented by the public terminals 100 connected communicably to control servers run by distributors. The service of printing picture data taken by users' digital cameras may be implemented by the public terminals 100 having the following facilities: either an interface connectable to digital cameras to tap picture data therefrom, or a driver capable of capturing picture data from a removable storage medium taken out of digital cameras; and a printer for printing the captured picture data.

1-2. Public Terminals

Figure 2:
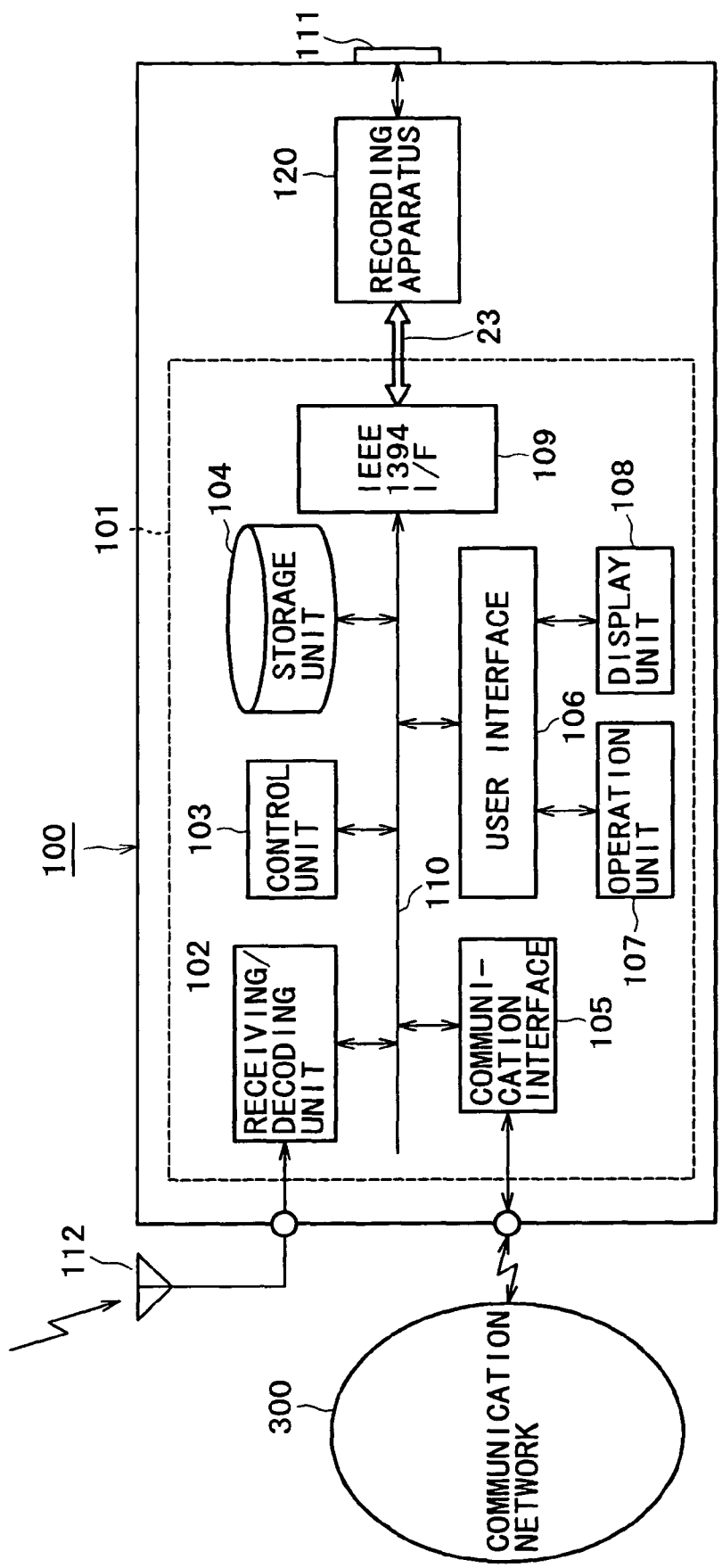
FIG. 2 is a block diagram of a public terminal embodying the invention.

FIG. 2 is a block diagram of a typical public terminal 100 embodying the invention. Each public terminal 100 comprises a main processing unit 101 for controlling the entire terminal in operation, and a recording apparatus 120 for writing music data to the disc cartridge 90. This terminal 100 is characterized in that it supplements the main processing unit 101 with the recording apparatus 120 for specifically implementing the music data recording function.

The main processing unit 101 includes: an antenna 112 for receiving radio signals from the communication satellite 400; a receiving/decoding unit 102 that receives, amplifies and decodes music data of this service sent from the communication satellite 400; a storage unit 104 for storing music data constituting a plurality of tunes offered for sale by this service; a communication interface 105 for communicating with the control center 200; a user interface 106 for interfacing the operation unit 107 and display unit 108 to the other circuits; an IEEE (Institute of Electrical and Electronic Engineers) 1394 interface connected to the recording apparatus 120 for handling the disc cartridge 90; and a control unit 103 for providing overall control.

The receiving/decoding unit 102 receives radio signals from the communication satellite 400 via the antenna 112 and decodes the received signals. More specifically, the receiving/decoding unit 102 first receives music data sent from the communication satellite 400. Under control of the control unit 103, the receiving/decoding unit 102 moves the received music data through an internal data bus 110 into the storage unit 104 for storage. The storage unit 104 is illustratively a mass storage hard disc drive that accommodates music data making up a plurality of tunes offered for sale by this service.

The operation unit 107 to be operated by the user comprises a keyboard, numerical keys, a joystick, and/or a track ball. The display unit 108 is constituted illustratively by a CRT or a liquid crystal display panel. The display unit 108 may alternatively be a touch panel integrated with the operation unit 107. The user interface 106 takes operation signals generated in response to the operations performed by the user on the operation unit 107, converts the signals into command signals in a format that can be processed internally, and inputs the command signals to the control unit 103 illustratively through the internal data bus 110. The user interface 106 also takes display data derived from display control operations by the control unit 103, converts the display data into video data in a format that can be displayed on the display unit 108, and outputs the converted data to the display unit 108 for display.

The communication interface 105 communicates with the control center 200 through the communication network 300. Illustratively, when maintenance information and other data are to be sent to the control center 200, the communication interface 105 converts the outgoing data to a format compatible with the communication protocol in effect before transmitting the converted data to equipment having a designated address. When data have been received over the communication network 300, the communication interface 105 converts the received data to a format that can be handled inside the public terminal 100, and transfers the converted data to relevant circuits over the internal data bus 110. The communication interface 105 in operation is controlled by the control unit 103.

The IEEE 1394 interface 109 is designed to conduct communications as per IEEE 1394 criteria. In this example, the IEEE 1394 interface 109 is used to communicate with the recording apparatus 120 that is capable of at least writing music data to the magneto-optical disc 90a in the disc cartridge 90. The recording apparatus 120 has its own IEEE 1394-compatible communication interface for exchanging music data with the main processing unit 101 as well as for exchanging various commands with external equipment. In this case, the recording apparatus 120 exchanges commands with the main processing unit 101 through an IEEE 1394-compatible data bus 23 and retrieves from the storage unit 104 the music data selected by the user. The communication interface for connecting the main processing unit 101 with the recording apparatus 120 is not limited to an IEEE 1394-compatible type; the interface may alternatively be any one of other wired or wireless types such as USB (Universal Serial Bus), Bluetooth, infrared-based IrDA (Infrared Data Association), and IEEE 802.11a/b/g arrangements.

Illustratively, if it is necessary for the recording apparatus 120 to write music data to the magneto-optical disc 90a in the disc cartridge 90 loaded in the loading unit, the applicable music data are first retrieved from the storage unit 104 under control of the control unit 103 in the main processing unit 101, output to the IEEE 1394 interface 109, and then supplied to the recoding apparatus 120 via the data bus 23. In this case, the IEEE 1394 interface 109 packetizes the music data in an IEEE 1394-compatible format and transfers the packetized data to the recording apparatus 120 at a predetermine data rate and in a suitably timed manner. The recording apparatus 120 receives the music data from the IEEE 1394 interface over the data bus 23 and writes the received data to the magneto-optical disc 90a in the disc cartridge 90.

The music data transmitted from the communication satellite 400 remain compressed to comply with the format of the disc cartridge 90. The data placed into and retrieved from the storage unit 104 for transfer to the recording apparatus 120 are also compressed. The recording apparatus 120 writes music data to the magneto-optical disc 90a in the disc cartridge 90 at 16× speed, i.e., 16 times the speed at which data in the compact disc format are read at the sampling rate of 44.1 kHz in 16-bit quantization. The high-speed recording is intended to shorten the period from the time that the user selects desired music data until the disc cartridge 90 with the selected data written thereon are returned to the user. The disc cartridge 90 inserted by the user through the cartridge slot 111 is loaded by a loading mechanism of the recording apparatus 120 into its loading unit wherein the cartridge is properly positioned. When target music data have been written to the disc or if attempts to write music data to the disc have failed, the loading mechanism ejects to an externally removable position the disc cartridge 90 that was inserted by the user through the cartridge slot 111.

1-3. Disc Cartridge Recording Apparatus (MD Recorder)

1-3-1. Internal Structure

Figure 3:
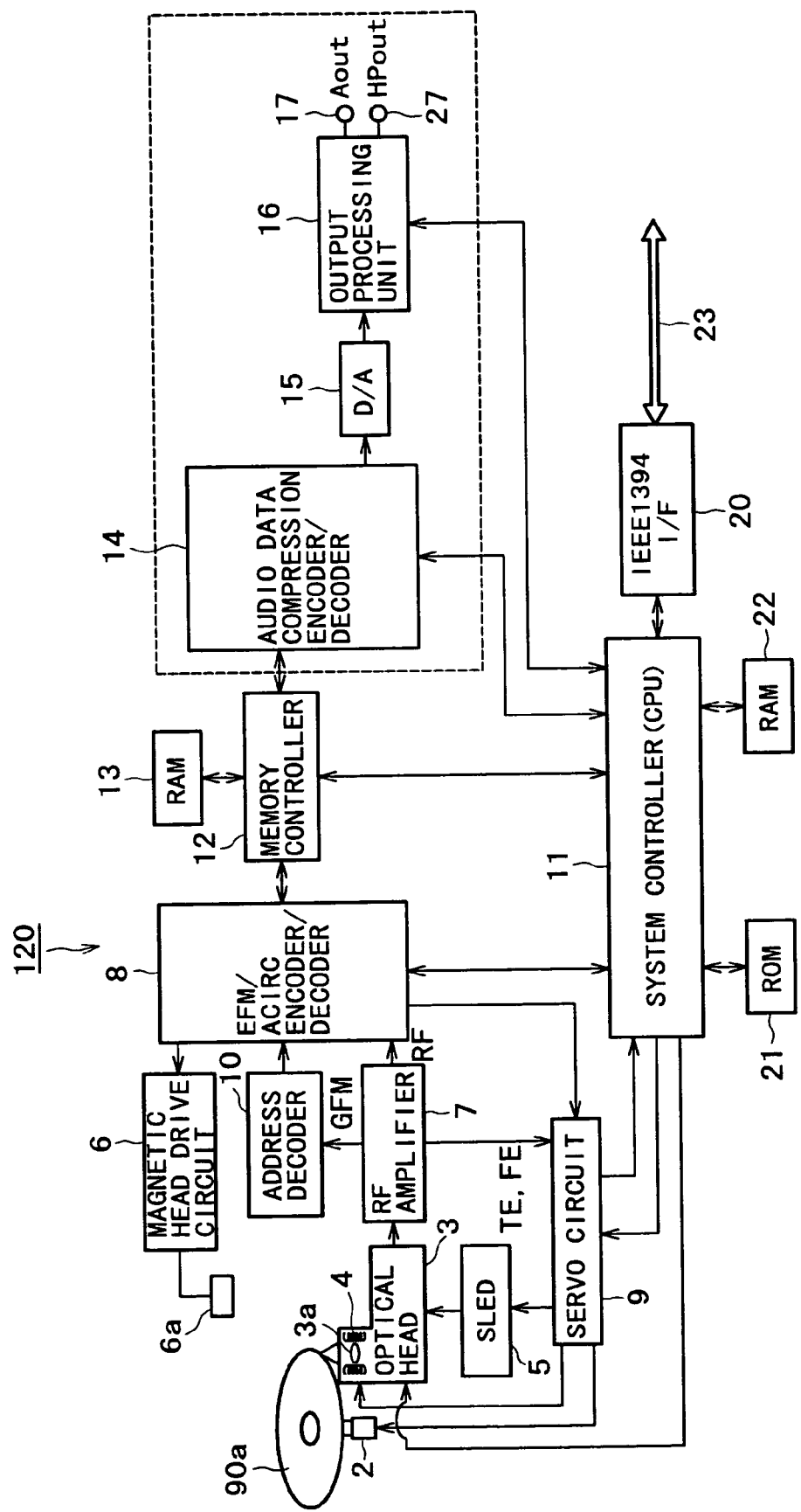
FIG. 3 is a block diagram of a recording apparatus constituting part of the inventive public terminal.

FIG. 3 is a block diagram of the recording apparatus 120 constituting part of the inventive public terminal 100. Since the recording apparatus 120 is designed to write music data purchased by the user, the apparatus is not required illustratively to read music data from the magneto-optical disc 90a in the disc cartridge 90 for output as reproduced sounds.

Still, the recording apparatus explained here is a commonly-used recording/reproducing apparatus capable of outputting analog audio signals partly because it has gained such widespread acceptance.

The disc cartridge 90 capable of storing music data is inserted through the cartridge slot 111 and loaded by the loading mechanism into the loading unit. In the loading unit, the magneto-optical disc 90a (a storage medium) is caught by a disc table mounted integrally on a drive shaft of a spindle motor 2 constituting a disc driving unit. When driven by the spindle motor 2, the magneto-optical disc 90a rotates in integral relation with the disc table. For a write or a read operation, an optical pickup 3 emits a laser beam to the magneto-optical disc 90a being turned by the spindle motor 2.

The optical pickup 3 includes: a semiconductor laser for emitting a laser beam; a photodetector for detecting a reflected laser beam from the magneto-optical disk 90a; and an objective lens 3a for focusing the laser beam from the semiconductor laser onto a target recording track on the magneto-optical disc. At the time of writing data, the optical pickup 3 emits a high-level laser beam to heat the target recording track up to the Curie temperature; for the reading operation, the optical pickup 3 emits a laser beam on a relatively low level to detect data from the reflected light based on the magnetic Kerr effect. The objective lens 3a is held by an objective lens drive mechanism 4 made up of a dual axis actuator arrangement. Held in that manner, the objective lens 3a is positioned relocatably in a focusing direction, i.e., close to or away from the magneto-optical disc 90a, as well as in a tracking direction perpendicular to the target recording track.

A magnetic head 6a is positioned in symmetrical relation to the objective lens 3a of the optical pickup 3 across the magneto-optical disc 90a mounted on the disc table. In operation, the magnetic head 6a applies a magnetic field modulated by supplied data to the magneto-optical disc 90a heated at least up to the Curie temperature. The optical pickup 3 and magnetic head 6a are moved in synchronism by a sled mechanism 5 in the radial direction of the disc.

The laser beam emitted by the semiconductor laser of the optical pickup 3 is reflected by the magneto-optical disc 90a. The reflected laser beam is detected by the photodetector whose light-receiving surface is split into a plurality of parts for photoelectric conversion. An electrical signal thus generated by the photodetector is fed to an RF amplifier 7. From the electrical signal, the RF amplifier 7 extracts a reproduced RF signal, a tracking error signal TE, a focus error signal FE, and groove information. The groove information refers to absolute position information recorded as pre-grooves in wobbling fashion on the magneto-optical disc 90a. The reproduced RF signal thus extracted is sent to an encoder/decoder unit 8. The tracking error signal TE and focus error signal FE are fed to a servo circuit 9, while the groove information is supplied to an address decoder 10.

The servo circuit 9 generates various servo signals based on the supplied tracking error signal TE and focus error signal FE, on a track jump command and an access command from a system controller 11 constituted by a microcomputer, and on detected rotation speed information from the spindle motor 2. Using the generated servo signals, the servo circuit 9 operates the objective lens drive mechanism 4 and sled mechanism 5 for focusing and tracking control purposes, and drives the spindle motor 2 in such a manner as to rotate the magneto-optical disc 90a at a constant linear velocity (CLV) or a constant angular velocity (CAV).

The address decoder 10 decodes the supplied groove information to extract address information. The extracted address information is sent to the system controller 11 for various control purposes. The encoder/decoder unit 8 demodulates the reproduced RF signal from the RF amplifier 7 as per EFM (eight to fourteen modulation) and subjects the result to decoding based illustratively on ACIRC (Advanced Cross Interleave Reed-Solomon Code). Furthermore, the encoder/decoder unit 8 extracts sub-code data and others from the reproduced RF and submits what is extracted to the system controller 11.

When music data are to be reproduced, the encoder/decoder unit 8 outputs to a memory controller 12 the music data which are recorded as sector data and which have illustratively undergone EFM demodulation and ACIRC decoding. The memory controller 12 writes the received music data temporarily to a buffer memory 13. Data are read from the magneto-optical disc 90a by the optical pickup 3 and the reproduced data are transferred from the optical pickup 3 to the buffer memory 13 at 1.41 Mbits/sec for standard-speed reproduction and usually in intermittent fashion to allow for the real-time sound reproduction. The data output from the encoder/decoder unit 8 and written to the buffer memory 13 are read from the memory in a suitably timed manner (to allow for the real-time sound reproduction) attaining a data transfer rate of 0.3 Mbits/sec for standard-speed reproduction; the retrieved data are output to an encoder/decoder unit 14. The encoder/decoder unit 14 decompresses the compressed data to generate a digital audio signal at the 44.1 kHz sampling rate in 16-bit quantization.

The digital audio signal output from the encoder/decoder unit 14 is converted by a digital/analog converter 15 into an analog signal. The analog signal is sent to an output processing unit 16 for level and impedance adjustment before being output as an analog audio signal Aout through a line output terminal 17 to external equipment. The analog signal is also output as a headphone output HPout through a terminal unit 27 to headphones, earphones or speakers connected.

The music data retrieved from the storage unit 104 are input to an IEEE 1394 interface 20 through a data bus 23 connected to the IEEE 1394 interface 109 of the main processing unit 101. The music data input to the IEEE 1394 interface 20 are written to the magneto-optical disc 90a in the disc cartridge 90 loaded into the loading unit of the recording apparatus 120. If the transmitted music data are formatted at the 44.1 kHz sampling rate in 16-bit quantization, the music data are transferred to the encoder/decoder unit 14 through the system controller 11. The encoder/decoder unit 14 compresses the received data. If the transmitted music data are found compressed so as to be compatible with the recording apparatus 120, the data are transferred to the memory controller 12 because there is no need to compress the data further via the system controller 11.

The memory controller 12 puts the input music data into the buffer memory 13 for temporary storage, retrieves the stored data in units of a predetermined amount, and transfers the retrieved data to the encoder/decoder unit 8. The transferred data are subjected to encoding processes such as ACIRC encoding and EFM modulation by the encoder/decoder unit 8. The encoded data are output to a magnetic head drive circuit 6. The ACIRC encoding involves supplementing target data with an error-correction code that is an interleave-modified variation of CIRC (Cross Interleave Reed-Solomon Code) adopted for the compact disc system as the error-correction code.

The magnetic head drive circuit 6 outputs to the magnetic head 6a a magnetic head drive signal reflecting the encoded write data. Given the drive signal, the magnetic head 6a applies an N or S magnetic field to part of the magneto-optical disc 90a heated up to at least the Curie temperature by the laser beam emitted by the optical pickup 3. At this point, the system controller 11 supplies the optical pickup 3 with a control signal causing the pickup to output a write-level laser beam.

The system controller 11 is illustratively a microcomputer that carries out various control operations. The system controller 11 is connected with a ROM (read only memory) 21 and a work RAM (random access memory) 22, among others. The ROM 21 is illustratively a flash memory, an EEPROM (electrically erasable programmable read-only memory), or any other suitable erasable memory device that may accommodate programs to be executed by the system controller as well as diverse settings. The work RAM 27 is used as a work area by the system controller 11 in carrying out various control processes.

The programs held in the ROM 21 can be updated. More specifically, if an update is needed, the control center 200 transmits update data such as patch files to the public terminals 100. The control center 200 may alternatively transmit update data via the communication satellite 400. The update data sent from the control center 200 are received by the antenna 112 or through the communication interface 105 of the main processing unit 101 in each public terminal 100. The control unit 103 forwards the update data to the storage unit 120 over the data bus 23. On receiving the update data from the main processing unit 101, the system controller 11 of the storage unit 120 executes accordingly an update operation on the programs being stored in the ROM 21.

Write and/or read operations are performed by referencing the control information written in radially inner regions of the magneto-optical disc 90a. The control information comprises P-TOC (pre-mastered TOC) and U-TOC (user TOC). A P-TOC area located on the radially innermost side of the magneto-optical disc 90a contains the following: identification data for identifying the storage medium (disc) as a read-only type or a writable type; a lead-out start address on a radially outer side of the disc 90a; a program area start address; a U-TOC start address; and P-TOC-related data such as optimal semiconductor laser output levels for the disc 90a. A U-TOC area located radially outside of the P-TOC area accommodates such U-TOC recordings as a disc title, track names, and on/off setting of copy protection. The system controller 11 references these items of control information in determining the addresses of the areas to or from which to write or read data on the magneto-optical disc 90a in the disc cartridge 90. The control information is retained in the buffer memory 13. That is, before starting a write or a read operation, the system controller 11 retrieves the control information from the radially innermost control area of the magneto-optical disc 90a and places the retrieved information into the buffer memory 13. Thereafter, the control information is referenced as needed for write, read or edit operations carried out on the magneto-optical disc 90a in the disc cartridge 90. The U-TOC area is renewed whenever data are written anew to the disc. After every write operation, the system controller 11 updates the U-TOC information in the buffer memory 13 and has the U-TOC area on the magneto-optical disc 90a updated likewise in a suitably timed manner.

According to this invention, the recording apparatus 120 need only be capable of writing music data; the apparatus 120 is not required to decompress music data read from the magneto-optical disc 90a in the disc cartridge 90 or to output the decompressed data for audio reproduction. Furthermore, the write data transferred from the main processing unit 101 are previously-compressed music data and are not required to be compressed inside the recording apparatus 120. It follows that the encoder/decoder unit 14, digital/analog converter 15, line output terminal 17, and headphone output terminal 27 enclosed by broken lines in FIG. 3 are not mandatory as far as this invention is concerned.

1-3-2. Error Handling Process

In the recording apparatus 120, the encoder/decoder unit 8 performs an error handling process as per ACIRC. The process involves carrying out error correction using C1 and C2 sequences. The data derived from EFM demodulation by the encoder/decoder unit 8 in FIG. 3 are accumulated in an internal RAM. The data stored in the internal RAM are subjected to error handling. FIGS. 4A and 4B show typical data derived from EFM demodulation and accumulated in the internal RAM. As illustrated in FIG. 4A, the data are stored in units of frames each consisting of 32 symbols. One symbol corresponds to one byte and is represented by a notation (m, n) wherein "m" stands for a frame number and "n" for a byte number in the frame; 32 bytes constitute one frame. At the time of error handling, the data in the internal RAM are rearranged in units of bytes into what is shown in FIG. 4B for error detection and correction using C1 and C2 sequences.

The C1 sequences each denote a 32-byte data unit of a vertical column. Illustratively, the rightmost column in FIG. 4B represents a C1 sequence comprising 32-byte data of (1.1) (1.2) (1.3) . . . (1.n) . . . (1.30) (1.31) (1.32) as one unit. Of the 32 bytes, the lower four bytes (1.29) (1.30) (1.31) (1.32) make up parity data P of the C1 sequence; the remaining 28 bytes constitute actual music data. The C1 sequence permits two-byte error detection and correction.

The C2 sequences each denote a collection of one byte per frame picked up every four frames in the diagonal direction from among the previously acquired data (except for party data P from the data per frame). In the example of FIG. 4B, a C2 sequence is made up of 28 bytes (−103.1) (−99.2) (−95.3) . . . (−107+4n.n) . . . (−3.27) (1.28). Of these 28 bytes, four bytes constitute party data Q of the C2 sequence; the remaining 24 bytes make up actual music data. The C2 sequence also enables two-byte error detection and correction to be carried out. In combination with the error pointer indicative of the result of error detection from the C1 sequence, it is possible to correct data drop-outs of up to four bytes.

Figure 4:
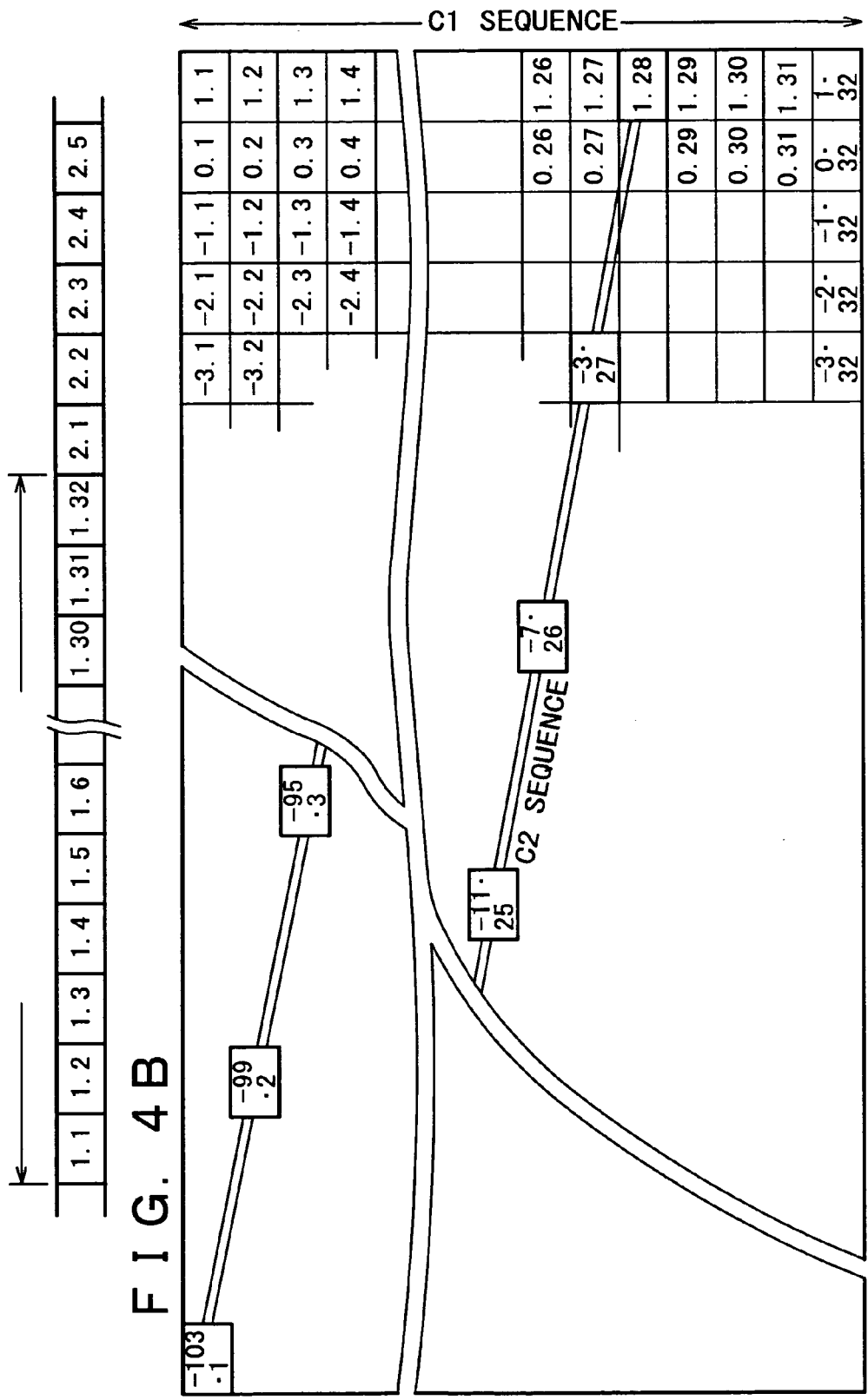
FIGS. 4A and 4B are explanatory views of error-correction code sequences for error handling.
Figure 5:
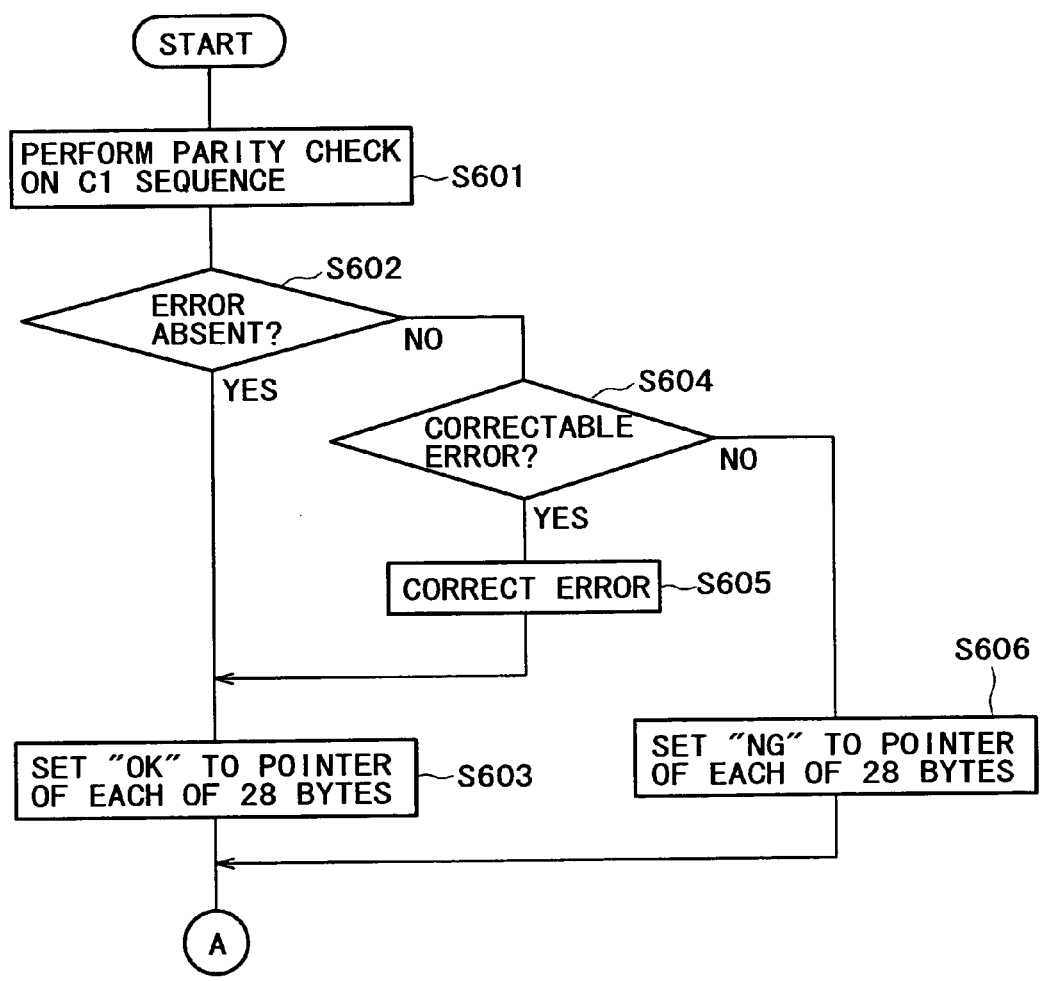
FIG. 5 is a flowchart of steps constituting an error handling process.
Figure 6:
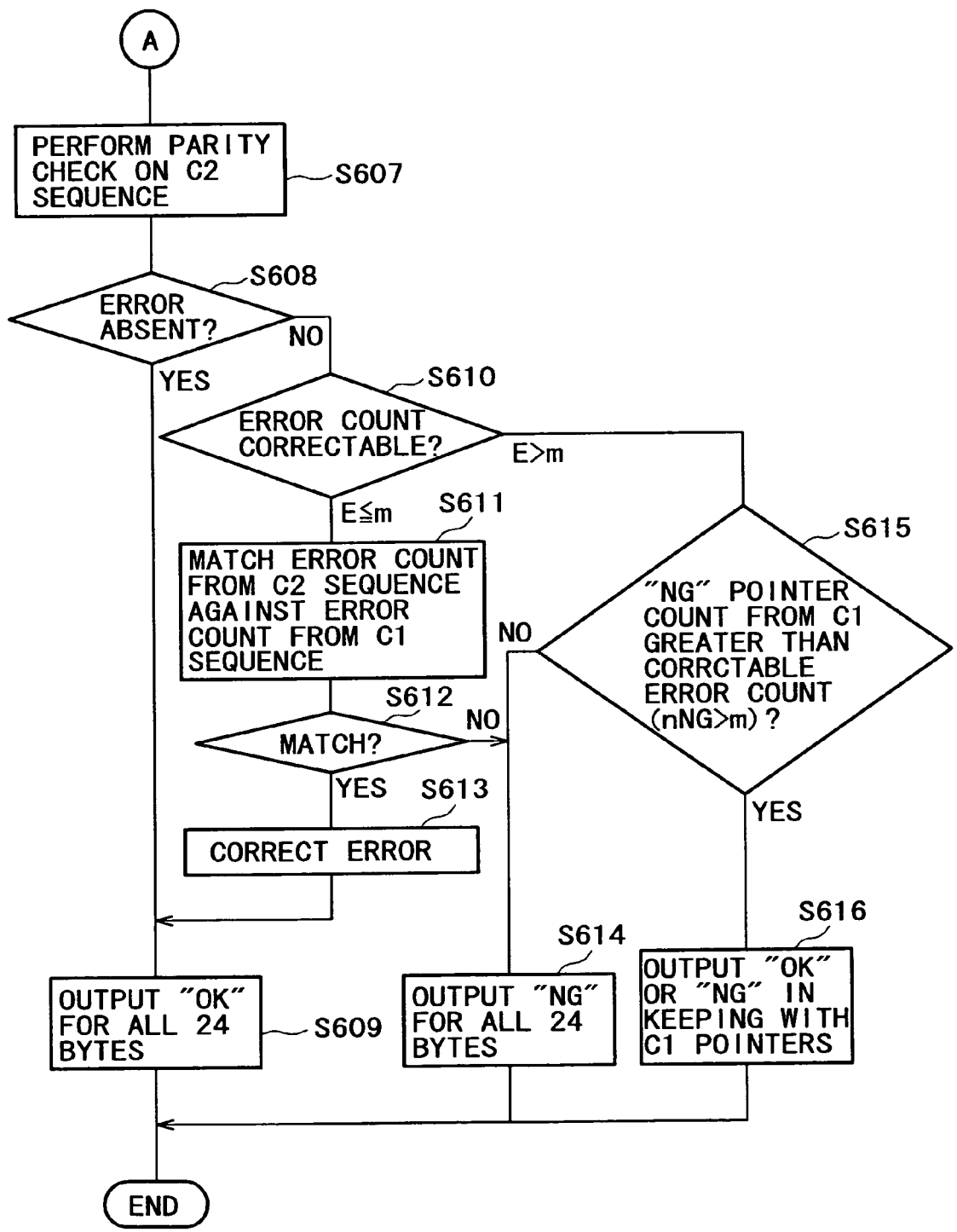
FIG. 6 is a flowchart of further steps constituting the error handling process.

FIGS. 5 and 6 are flowcharts of steps constituting a typical error handling process using the C1 and C2 sequences. These steps are carried out by the encoder/decoder unit 8. In step S601 of FIG. 5, the encoder/decoder unit 8 performs a parity check on the C1 sequence data of 32 bytes per frame shown in FIG. 4A. In step S602, the encoder/decoder unit 8 determines whether there is any error in the C1 sequence data on the basis of the result of the check in step S601. If no error is detected, the encoder/decoder unit 8 goes to step S603; if any error is found, step S604 is reached.

If there is no error, the encoder/decoder unit 8 goes to step S603 and sets an "OK" pointer to each of the 28 bytes of data (the "OK" pointer indicates the absence of error). Step S603 is followed by step S607 in FIG. 6.

If any error is detected, the encoder/decoder unit 8 reaches step S604 and determines whether or not the number of errors in the C1 sequence does not exceed a correctable error count which, in this case, is two bytes or less. If the number of errors in the C1 sequence is found to be equal to or less than the correctable error count, then the encoder/decoder unit 8 goes to step S605 and corrects the errors, and reaches step S603. If in step S604 the number of errors in the C1 sequence is found to be larger than the correctable error count, the encoder/decoder unit 8 goes to step S606 and sets an "NG" pointer to each of all 28 bytes of data (the "NG" pointer indicates the presence of error). Step S606 is followed by step S607 in FIG. 6.

In step S607 of FIG. 6, the encoder/decoder unit 8 performs a parity check on the C2 sequence. In step S608, the encoder/decoder unit 8 determines whether or not there is any error in the C2 sequence on the basis of the result of the check in step S607. If no error is detected, the encoder/decoder unit 8 goes to step S609; if any error is found, step S610 is reached. If there is no error in the C2 sequence, the encoder/decoder unit 8 goes to step S609 and sets an "OK" (no-error) pointer to each of the 24 bytes of data in the C2 sequence. If any error is detected in step S608, the encoder/decoder unit 8 reaches step S610 and determines whether or not the number of errors (error count E) in the C2 sequence does not exceed a correctable error count "m" ($E \leq m$). In this case, the correctable error count "m" is up to 4 (bytes) so that data drop-outs may be corrected.

If the error count E in the C2 sequence is found to be equal to or less than the correctable error count "m", then the encoder/decoder unit 8 goes to step S611 and matches the error count indicated by the pointer status derived from the error handling process of the C1 sequence against the error count resulting from the check on the C2 sequence. In step S612, a check is made to see if the two error counts match. Steps S611 and S612 serve to detect faulty error detection during the error handling process. Executing the two steps illustratively prevents incorrect error detection, i.e., the erroneous detection of nonexistent errors in the correct data.

If the error counts from the C1 and C2 sequences match, the encoder/decoder unit 8 goes to step S613. In step S613, the encoder/decoder unit 8 performs error handling of the C2 sequence. Step S613 is followed by step S609. If in step S612 the error counts from the C1 and C2 sequences do not match, the encoder/decoder unit 8 goes to step S614 and sets an "NG" pointer to each of the 24 bytes of data in the C2 sequence.

If in step S610 the error count N in the C2 sequence is found to be greater than the correctable error count "m" ($E > m$), then the encoder/decoder unit 8 goes to step S615 and references the error check pointers in the C1 sequence with regard to each of the bytes constituting the C2 sequence. The encoder/decoder unit 8 determines whether or not the number of pointers indicating "NG" (pointer count nNG) in the byte data of the C1 sequence is greater than the correctable error count "m" in the C2 sequence (nNG>m). If the pointer count nNG is not found to be greater than the correctable error count "m", then it is assumed that at least either of the detected error counts from the C1 and C2 sequences is erroneous. In this case, the encoder/decoder unit 8 goes from step S615 to step S614 and sets "NG" data to all pointers corresponding to the 24-byte data constituting the C2 sequence. If the pointer count nNG is found to be greater than the correctable error count "m", then it is assumed that the error count resulting from the check on the C1 sequence matches the error count derived from the check on the C2 sequence. In this case, the encoder/decoder unit 8 goes from step S615 to step S616 and sets "OK" or "NG" data to the pointers of the C2 sequence in keeping with the results of the pointers in the C1 sequence. In step S616, the earlier results of the pointers in the C1 sequence are copied to the pointers of the C2 sequence. This process is illustratively called C1 pointer copy (C1PC).

2. IEEE 1394 Data Interface 2-1. Overview

In the public terminal 100, the main processing unit 101 and storage unit 120 are structured to communicate with each other through an IEEE 1394 data interface and over the data bus 23. What follows is a description of data communications as per IEEE 1394 criteria.

IEEE 1394 is one of the serial data communication standards in use today. Under IEEE 1394, there are two methods for data transmission: an isochronous communication method for transmitting data periodically, and an asynchronous communication method for achieving asynchronous communication with no periodical data transmissions involved. The isochronous communication method is used to send and receive data, while the asynchronous communication method is used to send and receive control commands. Each of the two methods utilizes a single cable for data exchanges.

2-2. Stack Model

Figure 7:
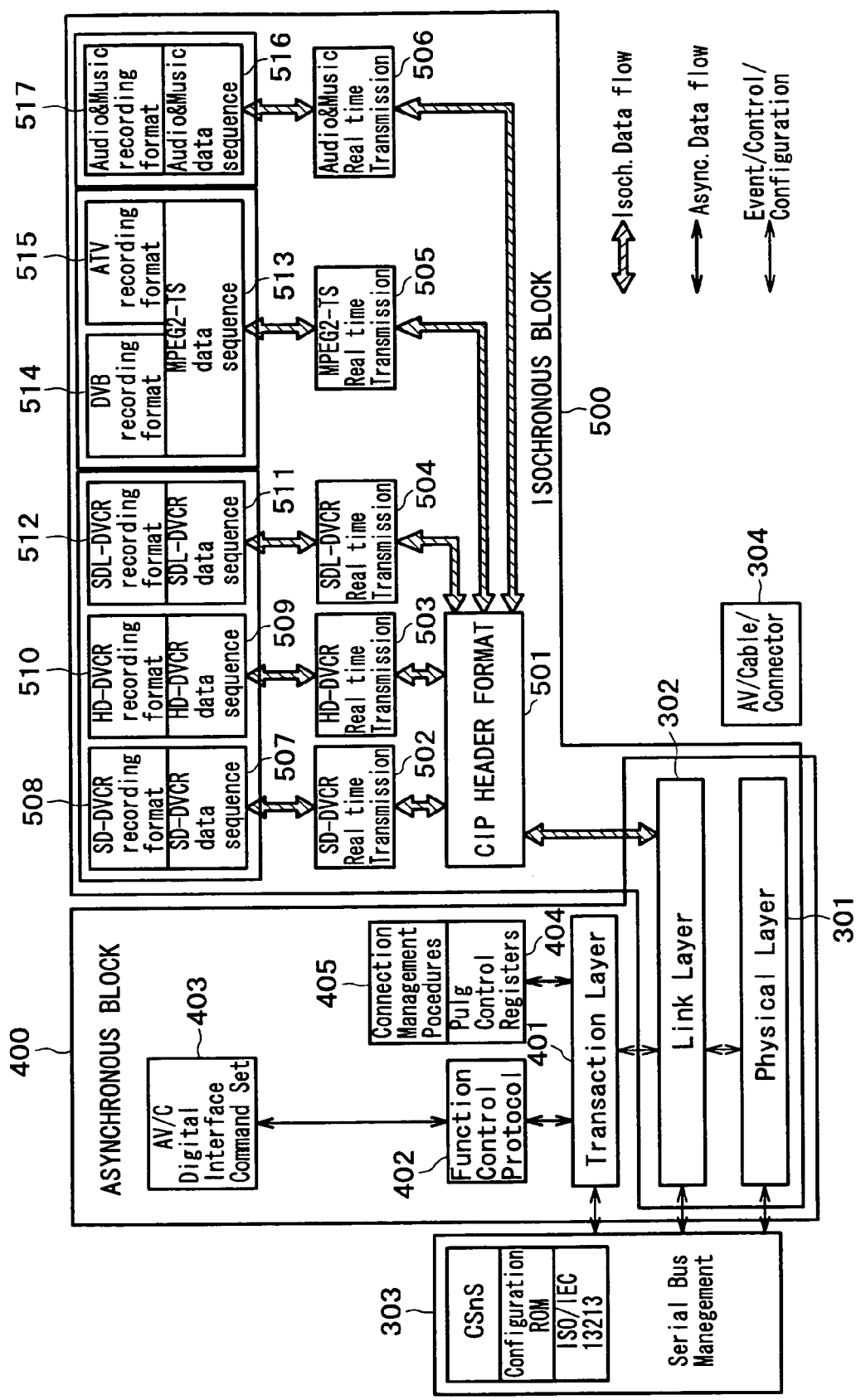
FIG. 7 is a schematic view of an IEEE 1394 stack model.

FIG. 7 shows an IEEE 1394 stack model. Where the IEEE 1394 format is concerned, there are two major blocks: an Asynchronous Block 400 and an Isochronous Block 500. Common to the Asynchronous Block 400 and Isochronous Block 500 are a Physical Layer 301 at the bottom and a Link Layer 302 above the bottom layer. The Physical Layer 301 is designed to control signal transmissions on a hardware basis. The Link Layer 302 is intended to convert the IEEE 1394 bus to an internal bus stipulated for individual pieces of equipment.

The Physical Layer 301, Link Layer 302, and a Transaction Layer 401 are linked to Serial Bus Management 303 by an Event/Control/Configuration line. An AV Cable Connector 304 represents physical connectors and/or cables for AV data transmission.

In the Asynchronous Block 400, the Transaction Layer 401 comes above the Link Layer 302. The Transaction Layer 401 stipulates data transmission protocols under IEEE 1394. For basic asynchronous transactions, the Transaction Layer 401 stipulates write transaction, read transaction, and lock transaction protocols.

Above the Transaction Layer 401 is FCP (Function Control Protocol) 402 that controls various AV devices using control commands specified as AV/C Commands (AV/C Digital Interface Command Set) 403. On top of the Transaction Layer 401 are Plug Control Registers 404 that establish Plugs (logical device connection relations under IEEE 1394) by use of Connection Management Procedures 405.

In the Isochronous Block 500, a CIP Header Format 501 comes above the Link Layer 302. Under control of the CIP Header Format 501, there exist such transmission protocols as SD-DVCR Real-time Transmission 502, HD-DVCR Real-time Transmission 503, SDL-DVCR Real-time Transmission 504, MPEG2-TS Real-time Transmission 505, and Audio and Music Real-time Transmission 506.

The SD-DVCR Real-time Transmission 502, HD-DVCR Real-time Transmission 503, and SDL-DVCR Real-time Transmission 504 are data transmission protocols regarding digital VTRs (video tape recorders). More specifically, the SD-DVCR Real-time Transmission 502 handles data in data sequences (SD-DVCR data sequence 507) obtained as per SD-DVCR recording format 508. The HD-DVCR Real-time Transmission 503 handles data in data sequences (HD-DVCR data sequence 509) acquired as per HD-DVCR recording format 510. The SDL-DVCR Real-time Transmission 504 handles data in data sequences (SDL-DVCR data sequence 511) as per SDL-DVCR recording format 512.

The MPEG2-TS Real-time Transmission 505 is a transmission protocol that illustratively addresses digital satellite broadcast tuners. This protocol deals with data in data sequences (MPEG2-TS data sequence 513) acquired as per DVB recording format 514 or ATV recording format 515.

The Audio and Music Real-time Transmission 506 is a transmission protocol that illustratively addresses digital audio equipment utilizing the digital cartridge 90 as a storage medium. This protocol deals with data in data sequences (Audio and Music data sequence 516) obtained as per Audio and Music recording format 517.

2-3. Packets

Figure 8:
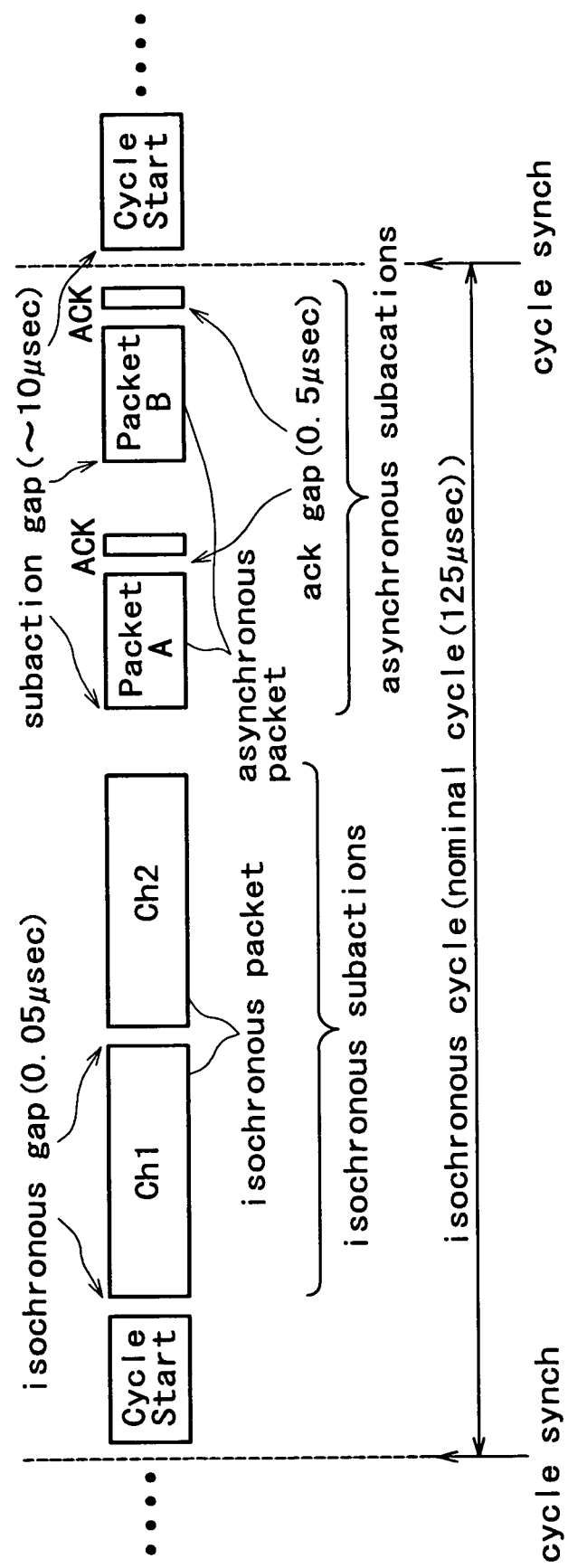
FIG. 8 is an explanatory view depicting how a packet transmission takes place as per IEEE 1394.

In the IEEE 1394 format, as shown in FIG. 8, data are transmitted by repeating isochronous cycles (normal cycles). In such a case, one isochronous cycle lasts 125 μsec over a 100 MHz band. One isochronous cycle may alternatively be other than 125 μsec. In the IEEE 1394 format, data are packetized before being transmitted at intervals of the isochronous cycle.

Each isochronous cycle is headed by a cycle start packet indicating the beginning of the cycle. When to generate the cycle start packet is specified by a particular device defined as a cycle master in an IEEE 1394 system. The cycle start packet is followed preferentially by isochronous packets which, as shown in FIG. 8, are grouped by channel and transferred on a time division basis (isochronous subactions). In isochronous subactions, packets are delimited by isochronous gaps of, say, 0.05 μsec each (as inactive periods). In this manner, the IEEE 1394 system allows isochronous data to be sent and received over multiple channels using a single transmission line.

Suppose now that compressed music data (also called ATRAC data where appropriate) compatible with the recording apparatus 120 handling the disc cartridge 90 are to be transmitted by the isochronous communication method and that the standard transfer rate for ATRAC data is 1.4 Mbps. In that case, time series continuity (i.e., real-time communicability) is ensured by transmitting isochronous packets of at least 20-odd-byte ATRAC data each in isochronous cycles of 125 μsec. For example, when an apparatus is to send ATRAC data, it requests an isochronous packet size large enough to ensure real-time transmission of the ATRAC data from IRM (Isochronous Resource Manager) in the IEEE 1394 system. While monitoring the ongoing data transmission status, IRM grants or withdraws permission to have the ATRAC data rearranged into isochronous packets for transmission over designated channels. That is, the IEEE 1394 interface permits reservation of bands.

Within isochronous cycle bands, those bands not used for isochronous subactions are utilized for asynchronous subactions (i.e., asynchronous packet transmission). FIG. 8 shows an example in which two asynchronous packets, packet A and packet B, are being transmitted. Each asynchronous packet is followed by an acknowledge signal (ACK) with an ACK gap of 0.05 μsec (inactive period) inserted therebetween. The signal ACK is output by hardware from the receiving side (i.e., target) to the transmitting side (i.e., controller) acknowledging to the latter that asynchronous data have been received during an asynchronous transaction. Each asynchronous packet and a signal ACK that follows it constitute a data transmission unit, and a subaction gap of about 10 μsec (inactive period) comes before and after the data transmission unit.

2-4. CIP (Common Isochronous Packet)

Figure 9:
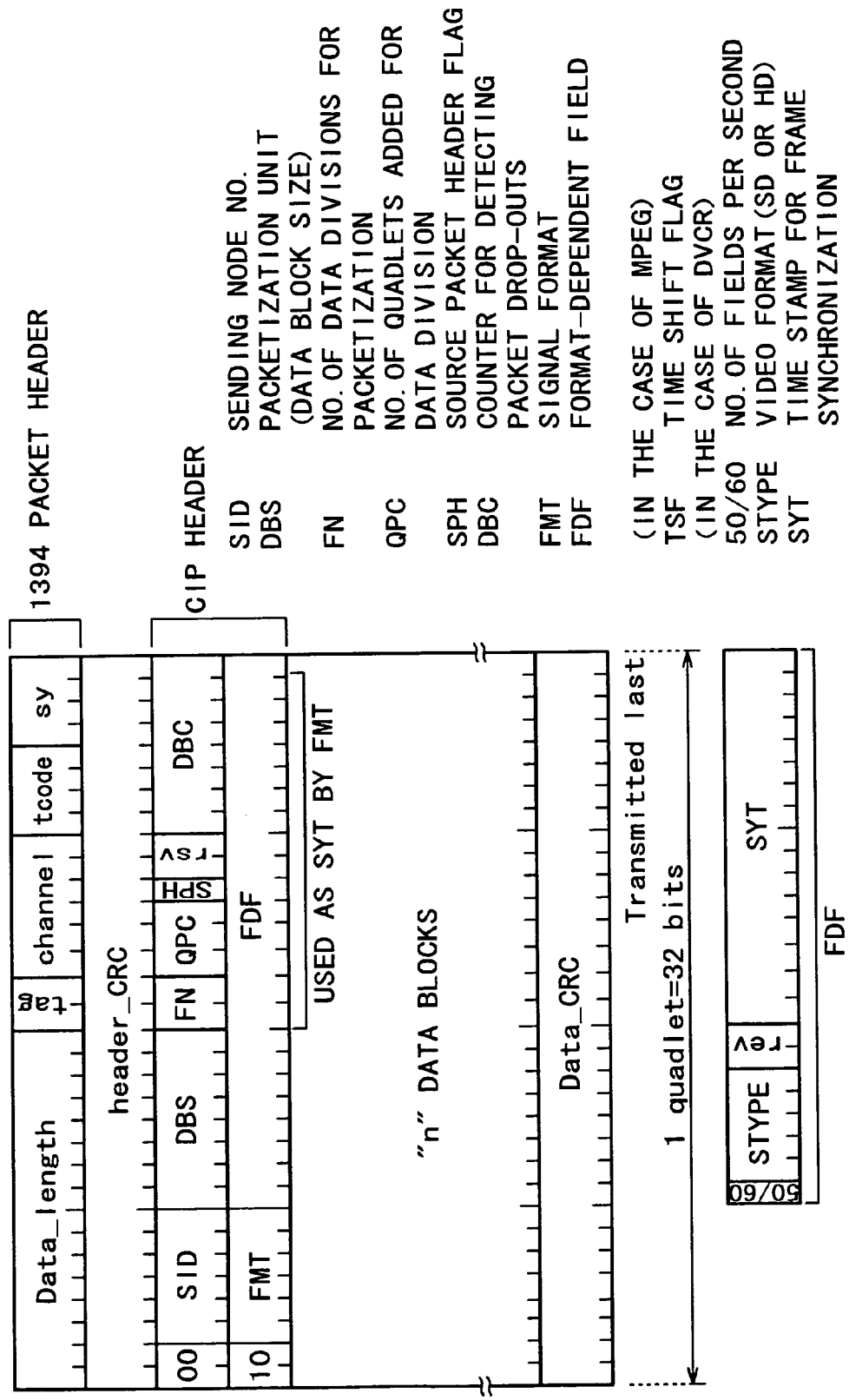
FIG. 9 is an explanatory view of a CIP structure.

FIG. 9 indicates CIP (Common Isochronous Packet), i.e., a typical data structure of the isochronous packet shown in FIG. 8. As discussed above, ATRAC data (music data), which can be read or written by the recording apparatus 120 handling the disc cartridge 90, are transmitted from the main processing unit 101 to the recording apparatus 120 by the isochronous communication method in an IEEE 1394 communication setup. An amount of ATRAC data (music data) large enough to ensure real-time communicability is placed in each of the isochronous packets that are transmitted in isochronous cycles.

The first 32 bits (1 quadlet) of a CIP make up an IEEE 1394 packet header. In this header, the topmost 16 bits constitute a data_length field, followed by a two-bit field called a tag, a six-bit field called a channel, a four-bit field called a tcode, and a four-bit field called a sy, in that order. A one-quadlet field subsequent to the IEEE 1394 packet header accommodates a header_CRC.

A two-quadlet field following the header_CRC field is a CIP header. The upper two bits in the high-order quadlet of the CIP header have "0" each. A six-bit field subsequent to the two-bit field accommodates SID (sending node number). An eight-bit field subsequent to the SID field stores DBS (data block size), followed by an FN field (2 bits) and a QPC field (3 bits), in that order. The FN field accommodates the number of data divisions made for packetization and the QPC field retains the number of quadlets added at the time of data division. Then comes an SPH (1 bit) field indicating a source packet header flag, followed by a DBC field that accommodates a counter value indicating the number of packet drop-outs.

The upper two bits in the low-order quadlet of the CIP header have "0" each. Subsequent to the two-bit field are an FMT field (6 bits) and an FDF field (24 bits). A value set as a signal format (transmission format) to the FMT field identifies the type of data (data format) stored in the CIP field. More specifically, the FMT field with its value identifies MPEG stream data, Audio stream data, digital video camera (DV) stream data, or others. The data format set in the FMT field corresponds to one of such transmission protocols as SD-DVCR Real-time Transmission 502, HD-DVCR Real-time Transmission 503, SDL-DVCR Real-time Transmission 504, MPEG2-TS Real-time Transmission 505, and Audio and Music Real-time Transmission 506 controlled by the CIP Header Format 501 shown in FIG. 7. The FDF field is a format-dependent field indicating a more detailed category of the data format classified by the FMT field. Given audio data, it is possible to distinguish illustratively linear music data from MIDI data. Where ATRAC data are in use, the FMT field first indicates that the data in question belong to the category of Audio stream data. The FDF field then holds a predetermined value identifying the Audio stream data as the ATRAC data.

For example, if the FMT field denotes MPEG data, then the FDF field holds synchronization control information called TSF (time shift flag). If the FMT field indicates DVCR (digital video camera) data, then the FDF field is defined as shown in the lower part of FIG. 9. Specifically, a 50/60 (1 bit) in the FDF field defines the number of fields per second; an STYPE (5 bits) stipulates either SD or HD video format; and an SYT indicates a time stamp for frame synchronization.

Following the CIP header are data whose type is indicated by the FMT and FDF fields and which are stored in "n" data block sequences. Where the FMT and FDF fields indicate the ATRAC data type, ATRAC data are stored in the data block field. At the end of the data blocks is a data_CRC field.

2-5. Commands and Responses Stipulated by FCP

Data transmission by the asynchronous communication method is controlled by the Function Control Protocol (FCP) shown in FIG. 7. What follows is a description of transactions controlled by FCP which, in this case, utilizes the write transaction protocol stipulated for asynchronous communications. All apparatuses that support FCP comprise a command/response register each. As shown in FIG. 13, transactions are implemented by writing suitable messages to the command/response register.

Figure 10:
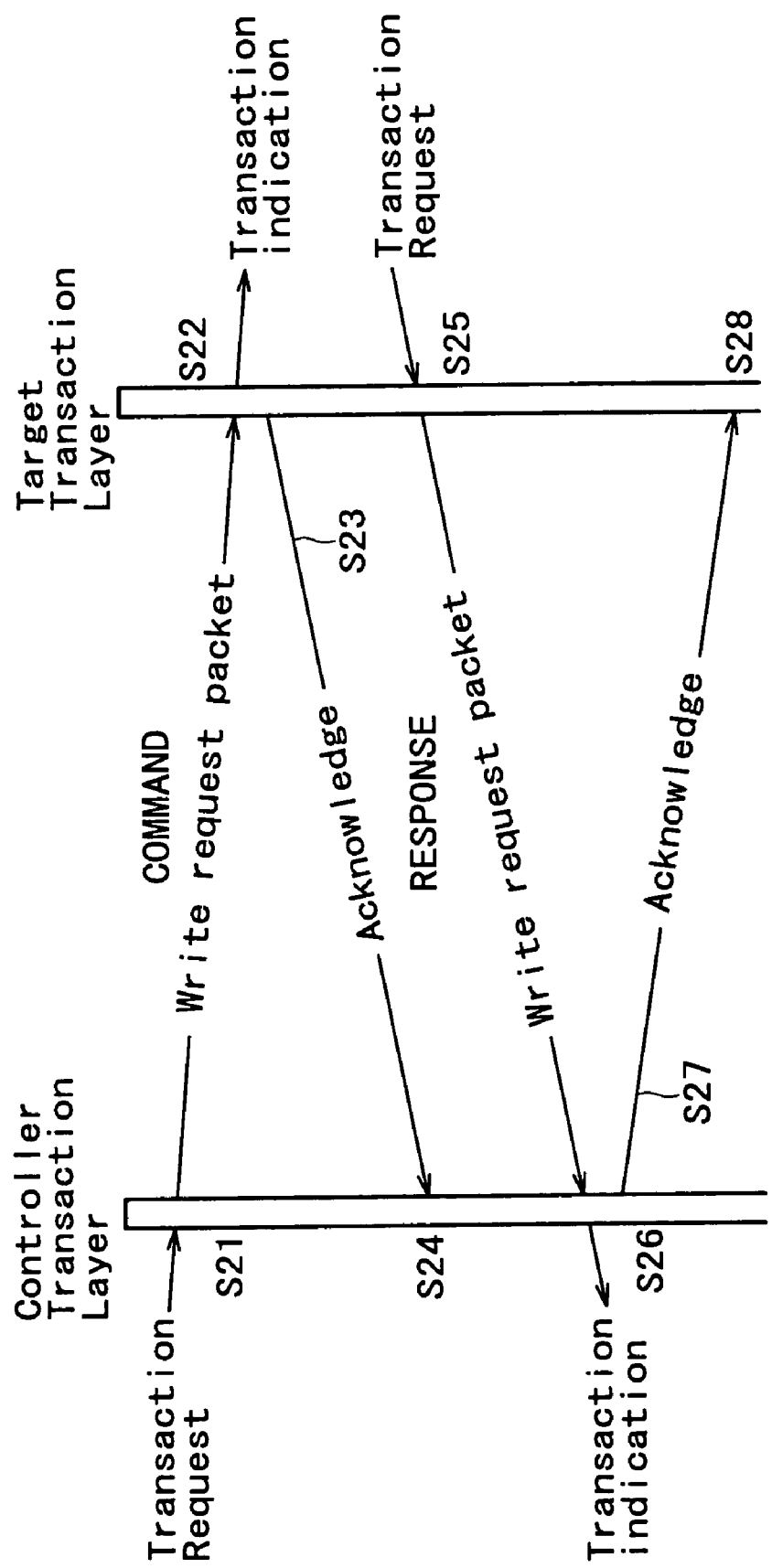
FIG. 10 is a state transition diagram indicating a write transaction in asynchronous communication.

In step S21 of the state transition diagram in FIG. 10, the controller generates a transaction request for command transmission, and sends a write request packet to the target. In step S22, the target receives the write request packet and writes data accordingly to the command/response register. In step S23, the target sends an acknowledge signal to the controller. In step S24, the controller receives the acknowledge signal. The steps so far constitute a command transmission process.

In response to the transmitted command, the target in step S25 sends a write request packet. In step S26, the controller receives the write request packet and writes data accordingly to the command/response register. In step S27, the controller transmits an acknowledge signal to the target upon receipt of the write request packet. In step S28, the target receives the acknowledge signal and comes to recognize that the write request packet has been received by the controller. That is, the controller sends a command to the target and the target returns a response to the controller in a basic data transmission (i.e., transaction) under FCP.

2-6. AV/C Command Packet

Figure 11:
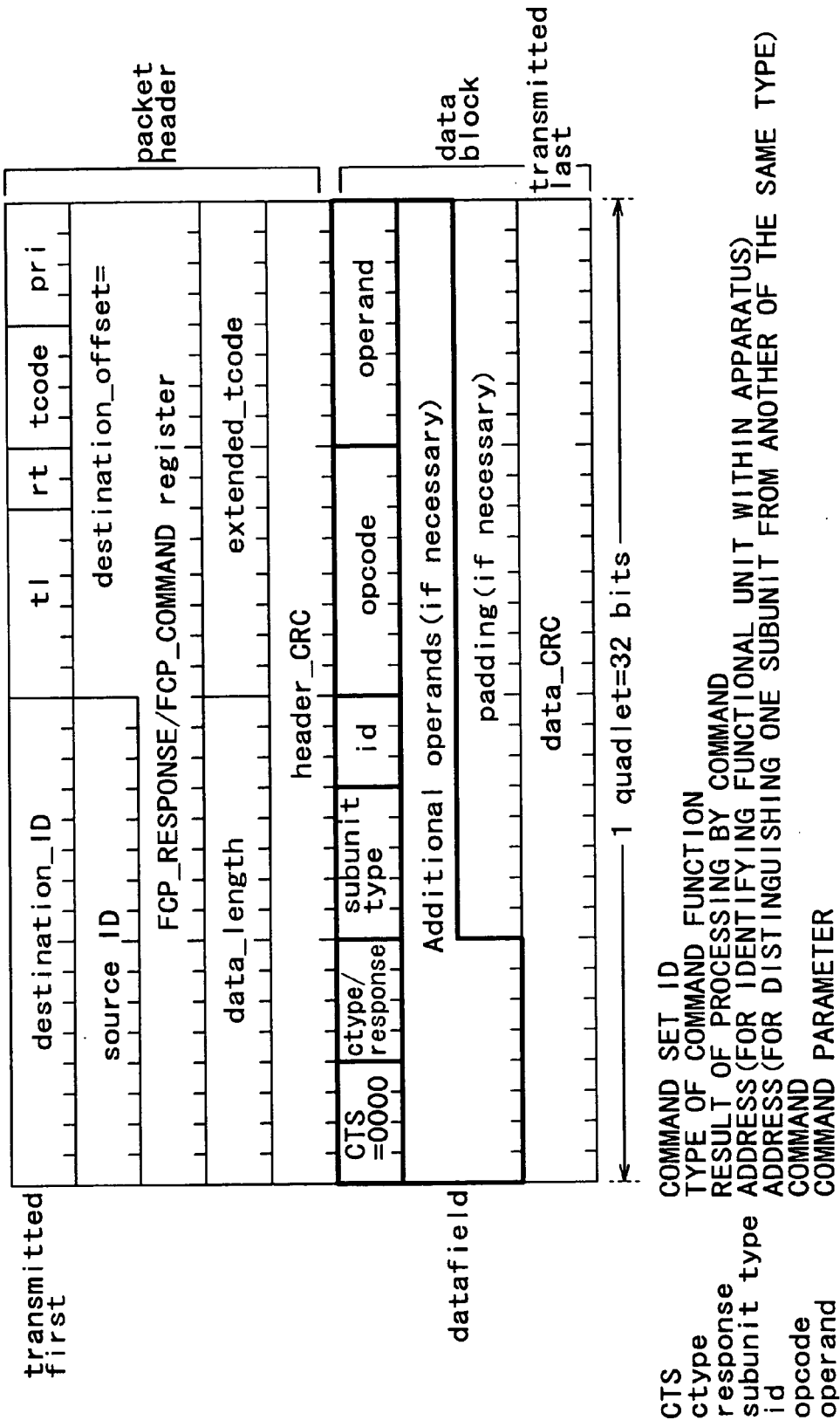
FIG. 11 is an explanatory view showing a typical structure of an asynchronous packet (AV/C command packet)

As explained above with reference to FIG. 7, FCP permits asynchronous communications with diverse AV devices using AV/C commands. For asynchronous communications, three transactions are stipulated: write, read, and lock. In practice, corresponding to these transactions, a write request/response packet, a read request/response packet, and a lock request/response packet are utilized, respectively. FIG. 11 schematically shows a typical format of a write request packet (asynchronous packet (write request for data block)). This write request packet is used as an AV/C command packet.

The upper five quadlets in the write request packet (the first through the five quadlets) constitute a packet header. The first 16 bits in the first quadlet of the packet header make up a destination_ID representative of the node ID of a data destination. The next six-bit field denotes tl (transact label) indicating a packet number. A two-bit field following the six-bit field tl is rt (retry code) indicating whether this is a packet transmitted for the first time or is a retransmitted packet. A four-bit field subsequent to the two-bit field rt is tcode (transaction code) indicating command code, followed by a four-bit area pri (priority) indicating the priority of the packet.

The upper 16 bits in the second quadlet constitute a source_ID indicating the node ID of a data source. The lower 16 bits in the second quadlet and the entire third quadlet (a total of 48 bites) constitute a destination_offset field indicating addresses in a command register (FCP_COMMAND register) and a response register (FCP_RESPONSE register). The destination_ID and destination_offset fields above correspond to the 64-bit address space stipulated in the IEEE 1394 format.

The upper 16 bits in the fourth quadlet constitute a data_length field that indicates the data size of a datafield (shown enclosed by thick lines in FIG. 11). The lower 16 bits in the fourth quadlet make up an extended_tcode field that is used for tcode extension. The 32 bits making up the fifth quadlet constitute a header_CRC field that holds a CRC calculated value for performing checksum on the packet header.

A data block starts from the sixth quadlet following the packet header. At the top of the data block is a datafield. The first four bits of the datafield in the sixth quadlet retain CTS (command and transaction set). The CTS field represents the ID of a command set for this write request packet. Illustratively, if a value of [0000] is set in CTS, that defines what is described in the datafield as an AV/C command. That is, this write request packet is shown to be an AV/C command packet. For FCP to use the AV/C command requires that the value [0000] be written in the CTS field. A four-bit field subsequent to CTS accommodates either a ctype (command type, i.e., the category of command function) or a response to the result of processing with a command.

FIG. 12 lists typical ctype/response definitions. Values [0000] through [0111] may be used as the definitions of ctype (command). Specifically, the definition [0000] stands for CONTROL, [0001] for STATUS, [0010] for INQUIRY, and [0011] for NOTIFY. The definitions [0100] through [0111] are reserved at present. CONTROL is a command for controlling functions from the outside; STATUS is a command used to inquire status from the outside; INQUIRY is a command for inquiring the availability of support for the CONTROL command; and NOTIFY is a command used to notify an external entity of changes in status. Values [1000] through [1111] may be used as the definitions of response. Specifically, the definition [1000] stands for NOT IMPLEMENTED, [1001] for ACCEPTED, [1010] for REJECTED, [1011] for IN TRANSITION, [1100] for IMPLEMENTED/STABLE, [1101] for CHANGED, and [1111] for INTERIM; [1110] is reserved. One of these responses is used depending on the command type. Illustratively, the response to the CONTROL command may be one of NOT IMPLEMENTED, ACCEPTED, REJECTED and INTERIM, selected in keeping with the status of the responder.

Referring to FIG. 11, a five-bit field subsequent to the ctype/response field accommodates a subunit type. The subunit type denotes a subunit (i.e., a device) acting as the destination of a command or as the source of a response. In the IEEE 1394 format, a unit refers to an apparatus and a subunit represents a functional unit incorporated in the apparatus. For example, a common VTR serving as a unit incorporates two subunits, i.e., a tuner for receiving terrestrial and satellite broadcasts, and a video cassette recorder/player for recording and reproducing the broadcasts. Typical subunit type definitions are listed in FIG. 13A. In FIG. 13A, a value of [00000] defines a monitor; [00001] through [00010] are reserved; [00011] defines a disc recorder/player; [00100] defines a VCR; [00101] defines a tuner; [00111] defines a camera; [01000] through [11110] are reserved; and [11111] defines a unit that is used where no subunit exists.

Referring again to FIG. 11, three bits subsequent to the subunit type field constitute an id field that holds a node ID identifying one of a plurality of subunits of the same type which may exist. An eight-bit field following the id field retains an opcode (i.e., operation code). The next eight bits make up a field that accommodates an operand. The operand field holds data (parameter) needed for use with an opcode. Opcodes are defined for each of the subunits involved; each subunit has its own opcode list table. For example, if the subunit is a VCR, a number of commands including PLAY (for reproduction) and RECORD (for write operation) listed in FIG. 13B are defined as the opcodes for the subunit. An operand is defined for each of the opcodes.

The datafield shown in FIG. 11 requiring the 32 bits of the sixth quadlet may be supplemented with additional operands if necessary. Subsequent to the datafield is a data_CRC field. Where necessary, the data_CRC field may be preceded by data as padding.

3. Write Error Preventing Operation

The public terminal 100 writes user-purchased music data to the magneto-optical disc 90a in the disc cartridge 90. During the writing of music data to the magneto-optical disc 90a, write errors can occur as a result of dust or other contamination sticking to the disc 90a or settling inside the writing apparatus 120 in charge of write operations. In view of such eventualities, this service system envisages maintaining the public terminal 100 as a preventive measure before its writing apparatus 120 develops a write error.

At the public terminal 100, the user (customer) selects desired music data, designates the manner of settling the payment, performs operations of purchasing the music data, and inserts his or her disc cartridge 90 through the cartridge slot 111. In turn, the main processing unit 101 of the public terminal 100 outputs a command for requesting the user-selected music data over the data bus 23 compatible with the IEEE 1394 data interface to the writing apparatus 120.

Figure 14:
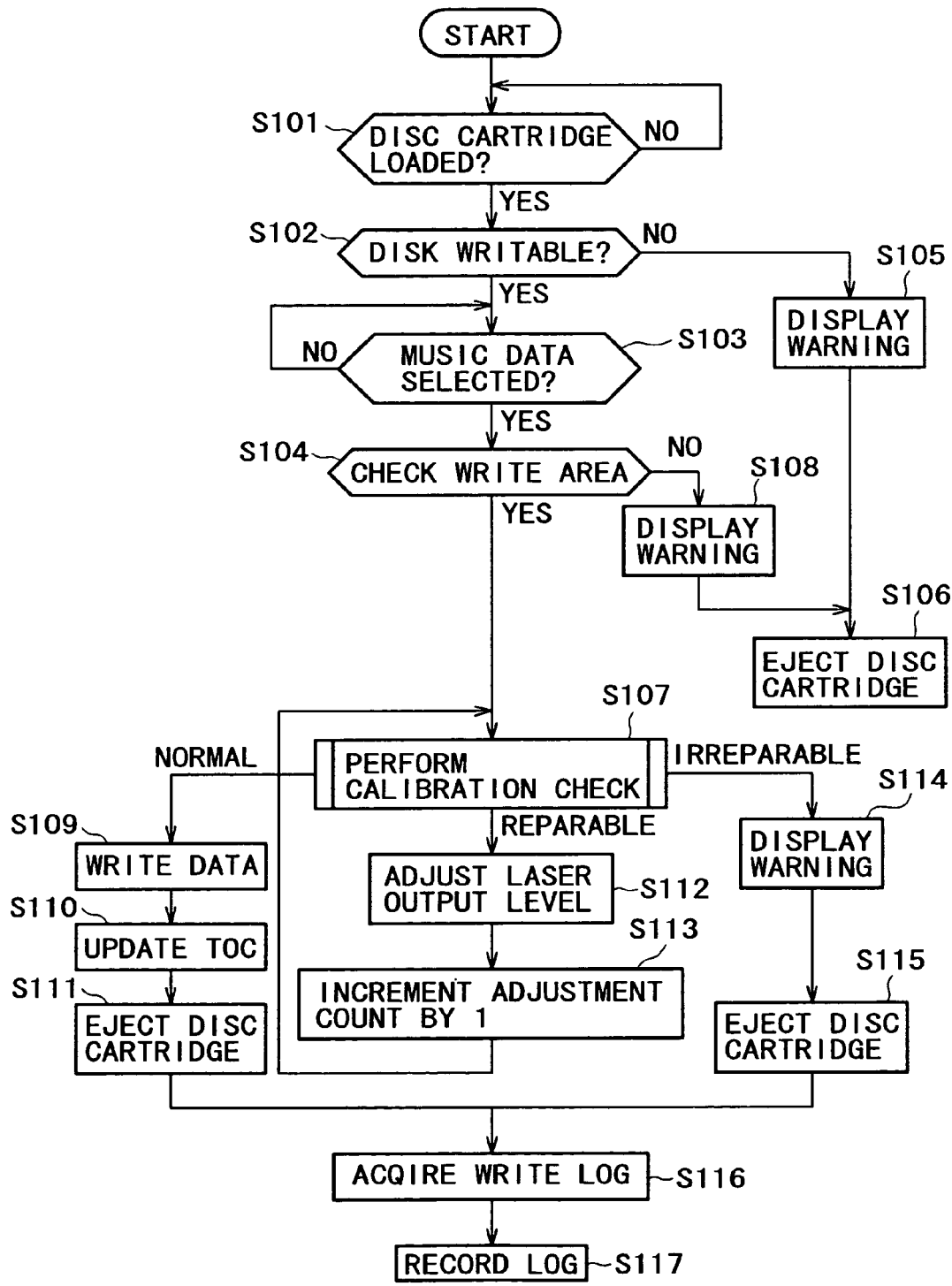
FIG. 14 is a flowchart of steps in which the recording apparatus writes music data.

FIG. 14 is a flowchart of steps in which the recording apparatus 120 writes music data to the magneto-optical disc 90a in the disc cartridge 90. These steps are carried out specifically by the system controller 11 of the recording apparatus 120.

In step S101, the system controller 11 determines whether the disc cartridge 90 inserted through the cartridge slot 111 has been properly loaded into the loading unit. More specifically, a pressure-activated switch or the like located near the cartridge slot 111 detects insertion of the disc cartridge 90. Upon detection, the switch causes the system controller 11 to drive a motor that transports the disc cartridge 90 from the slot 111 to the loading unit so that the cartridge is loaded correctly. Two read/write apertures on the disc cartridge 90 over both sides of the magneto-optical disc 90a held rotatably inside are slid open by a shutter member to partially expose the disc surfaces. The magnetic head 6a gains access to the disc 90a through one aperture while the objective lens 4 of the optical pickup 3 is positioned against the disc 90a through the other aperture. The magneto-optical disc 90a is caught by a disc table mounted integrally on the drive shaft of the spindle motor 2, whereby the disc 90a is rotated in integral relation to the disc table. The loading unit in which to load the disc cartridge 90 is furnished with a pressure-activated switch or the like detecting loading of the disc cartridge 90. The pressure-activated switch, upon detecting secure loading of the disc cartridge 90 into the loading unit, notifies the system controller 11 in the recording apparatus 120 of the correct loading. This prompts the system controller 11 to reach step S102. Step S101 is repeated if the system controller 11 fails to be notified of the disc cartridge 90 having been loaded into the loading unit.

In step S102, the system controller 11 of the recording unit 120 determines whether a write-protect feature of the disc cartridge 90 is set for write operation. The write-protect feature comprises a detection hole on the disc cartridge 90 and a write-protect tab that may be operated to open or close the hole. When the write-protect tab is operated to open the detection hole, the write-protect feature is set to inhibit write operation; when the tab is operated to close the detection hole, the write-protect feature is set to permit write operation. The loading unit has a mechanical or optical detector for detecting the opening and closing of the detection hole. When the detection hole is found to be closed, the system controller 11 recognizes a write-disabled state; when the detection hole is found open, the system controller 11 recognizes a writable state. When the disc cartridge 90 loaded in the loading unit is found to be writable, the system controller 11 goes to step S103; if the disc cartridge 90 is not found writable, step S105 is reached.

In step S105, the system controller 11 displays on the display unit 108 a warning message saying that the write-protect feature of the disc cartridge 90 is set to inhibit writing and may need to be switched for the writable state. In step S106, the system controller 11 drives the loading mechanism to eject the disc cartridge 90 from the loading unit so that the user can switch the write-protect feature of the cartridge for write operation.

When the disc cartridge 90 is in the writable state, the recording apparatus 120 drives the spindle motor 2 to rotate the magneto-optical disc 90a at CLV or at CAV while activating the semiconductor laser in the optical pickup 3 to emit a laser beam onto the disc. The magneto-optical disc 90a is accessed first for its radially inner side where the control area is located. In step S104, the system controller 11 reads control information from the P-TOC and U-TOC areas and places the retrieved information in the buffer memory 13 from which relevant data such as an optimal laser beam intensity and a writable capacity are extracted. The system controller 11 determines whether the magneto-optical disc 90a has a sufficient capacity to record the music data selected by the user. This step is needed because the disc cartridge 90 brought in by the user is not necessarily a blank cartridge; it may also be a disc cartridge already retaining music data constituting one or a plurality of tunes. When the disc cartridge 90 is found to have a capacity large enough to accommodate the music data selected anew by the user, the system controller 11 goes to step S107. If the disc cartridge 90 is not found to have a capacity sufficient to hold the user-selected music data, the system controller 11 reaches step S108. In step S108, the system controller 11 displays on the display unit 108 a warning message saying that an insufficient capacity available of the magneto-optical disc 90a in the disc cartridge 90 makes recording of the selected music data impossible and that a new disc cartridge is needed. Step S108 is followed by the above-described step S106 in which the system controller 11 causes the disc cartridge 90 to be ejected from the loading unit.

If in step S104 the magneto-optical disc 90a in the disc cartridge 90 loaded into the loading unit is found to have a capacity large enough to hold the user-selected music data, the system controller 11 goes to step S107 and performs a calibration check. That is, the system controller 11 determines whether it is possible to write the music data to the magneto-optical disc 90a without triggering a write error.

How the calibration check is carried out will now be described with reference to the flowchart of FIG. 15. In step S211, the system controller 11 designates a calibration area address and moves the optical pickup 3 radially over the magneto-optical disc 90a so as to let the optical pickup 3 access the calibration area on the disc 90a. The calibration area is a physical area of a predetermined size allocated illustratively on the radially inner side of the disc. This is an area designed to accommodate not actual data such as music data but calibration data for certain adjustment.

In step S222, the system controller 11 reads calibration data illustratively from the ROM 21 and writes the retrieved data to the calibration area of the magneto-optical disc 90a. The calibration data are those data of a specific pattern which are written to the disc 90a in order to measure an error rate. Illustratively, the calibration data may be part of music data having a particular pattern, the data part being compressed by ATRAC and supplemented with ACIRC (error-correction code). In other words, the calibration data may be prepared in the same write format in which music data are actually written. Where the calibration data are EFM-modulated data supplemented with error-correction code in the same manner as the actual write data, the error-checking environment implemented here is made substantially similar to the environment in which to write actual music data.

After reading the calibration data from the ROM 21, the system controller 11 outputs the retrieved data to the encoder/decoder unit 14. The data are ATRAC-compressed by the encoder/decoder unit 14 before being forwarded to the memory controller 14 and placed into the buffer memory 13 for temporary storage. Retrieved from the buffer memory 13, the data are supplemented with the error-correction code and subjected to EFM processing by the encoder/decoder unit 8 before being output to the magnetic head drive circuit 6. Obviously, the calibration data may be previously compressed data that would be sent from the system controller 11 to the memory controller 12.

Where the calibration data are to be written to the calibration area on the magneto-optical disc 90a, the system controller 11 drives the semiconductor laser of the optical pickup 3 at the write level that is higher than the data read level. The laser beam generated by the semiconductor laser is emitted to an appropriate location in the calibration area of the magneto-optical disc 90a so as to heat the beam spot on the disc up to at least the Curie temperature. At the same time, the magnetic head 9a applies an external magnetic field reflecting the calibration data so as to write the data to the calibration area.

Following the writing of the calibration data, the system controller 11 goes to step S233 and starts reading the calibration data from the calibration area. Specifically, the system controller 11 drives the semiconductor laser of the optical pickup 3 at the read level that is lower than the write level while emitting the laser beam to the calibration area. The optical pickup 3 with its photodetector detects a reflected laser beam from the magneto-optical disc 90a, submits what is detected to photoelectric conversion, and outputs the result of the conversion to the RF amplifier 7. In turn, the RF amplifier 7 generates a reproduced RF signal and outputs the generated signal to the encoder/decoder unit 8.

In step S234, the reproduced RF signal is input to the encoder/decoder unit 8 for error checks on the retrieved calibration data. Whereas the encoder/decoder unit 8 performs ACIRC-based error handling of both the C1 and C2 sequences as shown in FIGS. 4 and 5, the encoder/decoder unit 8 in this case measures an error rate of the C1 sequence. That is, the encoder/decoder unit 8 obtains this error rate as an error incidence of the C1 sequence over a predetermined unit data length of the reproduced calibration data.

The error check in step S234 is performed as follows: during the error handling process carried out in the steps of FIGS. 5 and 6, the number of NG pointers is obtained in step S606 regarding the C1 sequence. The system controller 11 then obtains the ratio of the NG pointer count about the C1 sequence to the total number of C1 pointers corresponding to the predetermined unit data length of the calibration data. The ratio is acquired as an error rate which is written in the next step S108 to, say, the RAM 22 for storage.

The system controller 11 retains a first and a second threshold value in the ROM 21 or other suitable location. The first threshold value is used by the system controller 11 as a yardstick for determining whether the measured error rate is normal. That is, if the error rate is found to be smaller than the first threshold value, the system controller 11 determines that the recording apparatus 120 is normal. The second threshold value is used as a yardstick for determining whether the error rate is at an irreparably abnormal level. If the measured error rate is found to exceed the second threshold value, the system controller 11 determines that the erroneous state is irreparable even after the error handling process, and withdraws the recording apparatus 120 from service. If the measured error rate falls between the first and the second threshold values, then the system controller 11 determines that raising the level of semiconductor laser output will permit normal data recording following the error handling process to redress the situation.

Dust or other contamination sticking on the objective lens 3a of the optical pickup 3 can disperse the laser beam emitted by the semiconductor laser. A disrupted laser beam emitted at normal level to the magneto-optical disc 90a is incapable of heating the beam spot on the disc up to at least the Curie temperature for a normal write operation. This problem is resolved by making the output level of the semiconductor laser higher than the normal write level. However, an excess boost in the semiconductor laser output can heat adjacent write tracks up to or higher than the Curie temperature, making it impossible to write the data correctly.

Figure 15:
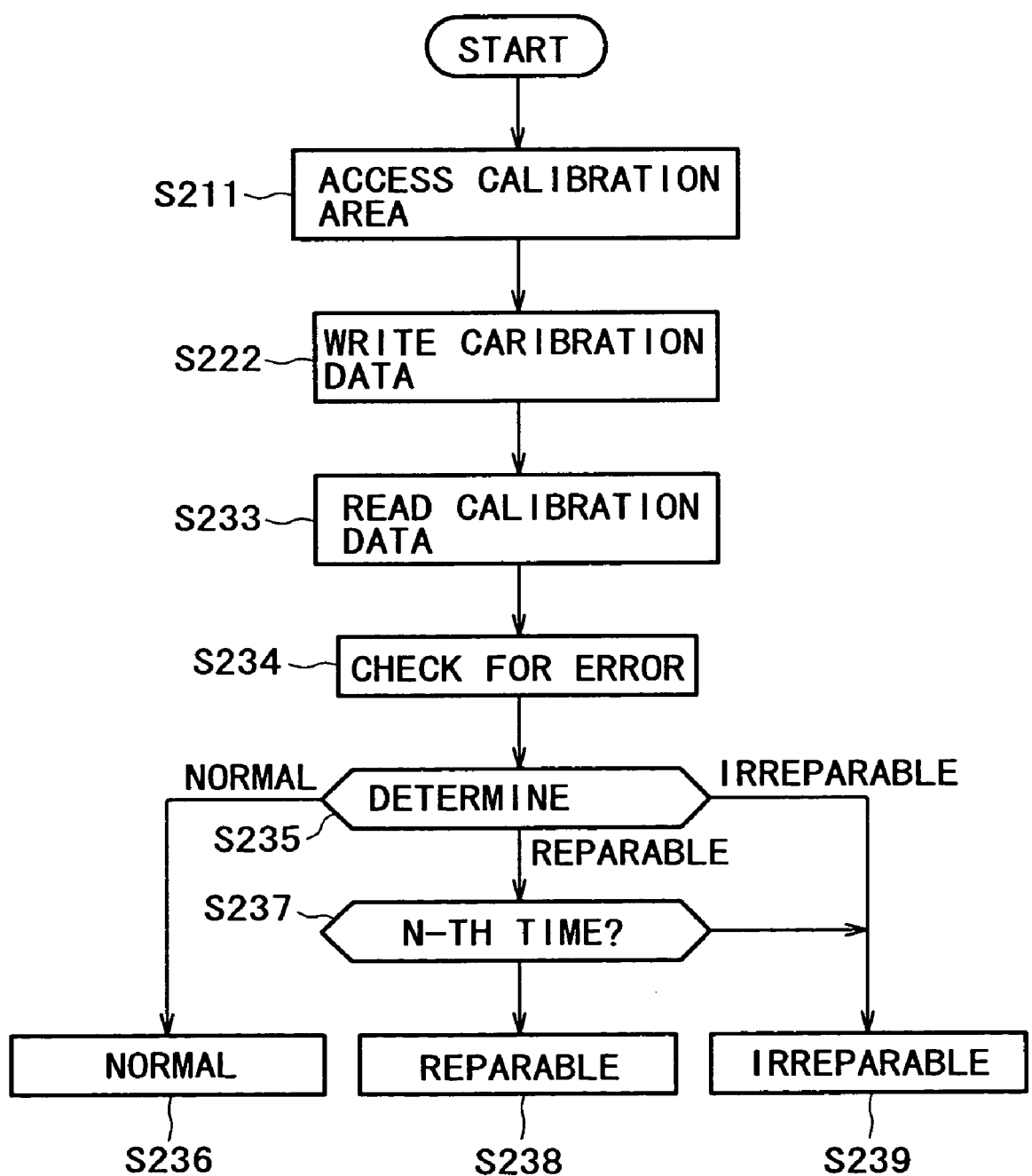
FIG. 15 is a flowchart of steps constituting calibration checks.

When the measured error rate is found to be smaller than the first threshold value, the system controller 11 reaches step S236 of FIG. 15 determining that the objective lens 3a, magneto-optical disc 90a and other related parts are free of dust or other contamination and that normal data recording is possible. As a result, the system controller 11 drives the semiconductor laser at its normal output level (a first write level) for write operation.

If the measured error rate is found to fall between the first and the second threshold values, the system controller 11 goes to step S237 and determines whether the number of times (a count stored in the ROM 21, etc.) the semiconductor laser output level was raised to a second write level (a higher level) has reached a predetermined threshold count N. If the threshold count N is yet to be exceeded, the system controller 11 reaches step S238 determining that the error rate is still on a reparable level with the error handling process performed. If the number of times the semiconductor laser output level was raised to the second write level is found to have reached or exceeded the threshold count N, then the system controller 11 reaches step S239 and withdraws the recording apparatus 120 from service. When the threshold count N is found to be reached or exceeded, the objective lens 3a or other related parts are considered so contaminated that it is now virtually impossible to continue writing data correctly even after the error handling process. In this case, it is deemed better to clean or otherwise maintain the recording apparatus 120 as soon as possible.

Where the measured error rate is found to have exceeded the second threshold value, the system controller 11 could heat the magneto-optical disc 90$a$ up to at least the Curie temperature by raising the semiconductor laser output level up to or higher than the second write level. However, an excess boost in the laser output can heat adjacent disc locations higher than the Curie temperature, which will render correct data recording impossible. The system controller 11 thus withdraws the recording apparatus 120 from service. As described, if the measured error rate is found to have exceeded the second threshold value, the system controller 11 goes to step S239 and determines that the error rate is too high to be corrected by the error handling process. The system controller 11 also determines that the error rate is so high as to be irreparable by the error handling process if the number of times the semiconductor laser output level was raised to the second write level reaches or exceeds the threshold count N.

If the error rate measured when the calibration data were recorded and retrieved is lower than the first threshold value (i.e., on the normal level), the system controller 11 goes to step S109 of FIG. 14 and starts recording the music data selected by the user. Specifically, the music data read from the storage unit 104 are sent through the IEEE 1394 interface 109 of the main processing unit 101 over the data bus 23 to the IEEE 1394 interface 20 for input. If the input music data are found already compressed, there is no need for the encoder/decoder unit 14 to compress the data further. In that case, the IEEE 1394 interface 20 outputs the previously compressed input music data unmodified to the memory controller 12. If the input music data are not previously compressed, the IEEE 1394 interface 20 outputs the data to the encoder/decoder unit 14 for data compression. The encoder/decoder unit 14 compresses the received music data and forwards the compressed data to the memory controller 12.

The memory controller 12 reads the music data successively from the buffer memory 13. The retrieved music data are supplemented with the error-correction code and modulated by EFM in the encoder/decoder unit 8. The music data thus processed are input to the magnetic head drive circuit 6. At the same time, the optical pickup 3 drives the semiconductor laser on the first write level and emits the generated laser beam to a designated location for heating at least up to the Curie temperature. The magnetic head 6$a$ applies a magnetic field according to the music data input to the magnetic head drive circuit 6, onto the magneto-optical disc 90$a$ that is locally heated up to or higher than the Curie temperature.

In step S110 of FIG. 14, the system controller 11 replaces the U-TOC information held in the buffer memory 13 with the information updated after recording of the music data, and writes the updated U-TOC to the control area on the radially inner side of the magneto-optical disc 90$a$. The system controller 11 in step S111 drives the loading mechanism to eject the disc cartridge 90 on which the music data have been recorded and the U-TOC updated.

If the error rate measured when the calibration data were recorded and retrieved falls between the first and the second threshold values (i.e., on the reparable level), the system controller 11 goes to step S112 of FIG. 14 and drives the semiconductor laser on the second write level, which is higher in intensity than the first write level.

In step S113, the system controller 11 increments by one the number of times (a count held in the ROM 21, etc.) the semiconductor laser output level was raised to the second write level, and returns to step S107. In other words, the system controller 11 again measures the error rate after raising the semiconductor laser output level to the second write level. In this state, the system controller 11 writes the calibration data again to the calibration area, reads the recorded calibration data, measures the error rate, and determines whether the measured error rate is lower than the first threshold value, between the first and the second threshold values, or in excess of the second threshold value. After the error rate is made lower than the first threshold value by raising the semiconductor laser output level to the second write level, the system controller 11 writes the music data to the magneto-optical disc 90$a$ as described above, replaces the U-TOC information held in the buffer memory 13 with the information updated following the recording of the music data, and writes the updated U-TOC to the control area on the radially inner side of the disc 90$a$. The system controller 11 then activates the loading mechanism to eject the disc cartridge 90 on which the music data have been recorded and the U-TOC updated.

In addition, when the error rate measured after writing and retrieval of the calibration data is found to exceed the second threshold value, the system controller 11 could raise the semiconductor laser output level to the second write level or higher so as to heat the magneto-optical disc 90$a$ up to or higher than the Curie temperature. But such heating would also heat adjacent locations on the disc up to the Curie temperature, making it impossible to write the data correctly. In order to bypass the trouble, the system controller 11 withdraws the recording apparatus 120 from service. At this point, the system controller 11 goes to step S114 and displays on the display unit 108 a warning message saying that the music data selling service is currently unavailable to customers. In step S115, the system controller 11 activates the loading mechanism to eject the disc cartridge 90 from the loading unit so that the user may switch the write-protect feature of the cartridge 90 as needed.

Step S116 is reached after the music data have been written to the magneto-optical disc 90$a$ in the disc cartridge 90 and the cartridge 90 is ejected, or after the writing apparatus 120 is put out of service and the disc cartridge 90 is ejected. In step S116, log data are updated. In step S117, the updated log is transferred to the storage unit 104 of the main processing unit 101 over the data bus 23 compatible with the IEEE 1394 interface. The log refers to a collection of data about the past operations of the recording apparatus 120, such as error data pointing to possible causes of write errors as estimated by the system controller 11. The public terminal 100 transmits the log as maintenance information from the storage unit 104 to the control server in the control center 200.

The error rate measured as described above is determined primarily by two conditions: the condition of the disc cartridge 90, i.e., whether the magneto-optical disc 90$a$ inside has any dust or other contamination stuck on it, and the condition of the recording apparatus 120, i.e., how much dust or other contamination has settled on the objective lens 3$a$ inside. In such a setup, the error rate can vary depending on the conditions of the disc cartridge 90 and recording apparatus 120 in effect every time the cartridge 90 is inserted through the cartridge slot 11 and loaded. Because the recording apparatus 120 measures the error rate every time music data are to be recorded, it is possible to predict with precision the likelihood of write errors occurring in a write operation.

When the error rate of the magneto-optical disc 90$a$ in the disc cartridge 90 inserted through the cartridge slot 111 is found to exceed the second threshold value, or when the number of times the semiconductor laser output level was raised to the second write level has exceeded a predetermined threshold count and a write error is thereby predicted, the disc cartridge 90 is ejected and any attempt to write music data to the disc inside is denied. This prevents the music data from being recorded together with write errors. Writing the music data to the magneto-optical disc 90a accompanied by write errors results in the U-TOC information not being updated correctly. This, if left unchecked, would make it impossible to reproduce normally not only the music data last written but also the music data that were previously recorded on the magneto-optical disc 90a in the disc cartridge 90.

Before writing any music data, the recording apparatus 120 writes calibration data to the calibration area, reads the written data therefrom, and checks the retrieved data for error. On conventional public terminals, the TOC information is read from the control area of the magneto-optical 90a in the disc cartridge 90 before any music data are written. If the TOC information cannot be retrieved, the magneto-optical 90a of the disc cartridge 90 is deemed defective. However, read errors are less likely to occur than write errors. This has been a source of trouble for conventional terminals: even if write errors actually occur, the fact that the TOC information has been read normally leaves the music data written unchecked. As a result, the music data are sometimes recorded along with write errors. In other words, whether or not the TOC information can be read does not help to spot write errors correctly. By contrast, the recording apparatus 120 of the public terminal 100 according to this invention actually writes calibration data to the magneto-optical disc 90a and retrieves the written data for check. This makes it possible to associate the measured error rate with probabilities of write errors, whereby the write error incidence is predicted with high precision.

Whereas the recording apparatus 120 is designed to write calibration data to the calibration area, this is not limitative of the invention. Alternatively, calibration data may be written to the program area where music data are to be written on the magneto-optical disc 90a. In this case, the calibration data need to be erased from the program area before any music data are written there so as to prevent the residual calibration data from reducing the capacity of the program area. One advantage of this scheme of writing calibration data to the area where music data are to be actually written is that the error rate can be measured more accurately.

When the recording apparatus 120 has become defective, i.e., when the system controller 11 withdraws the recording apparatus 120 from service in step S239 of FIG. 15, it is necessary to report the failure to the control center 200 so that the latter will immediately take measures for maintenance. In such a case, as shown in FIG. 16, the control unit 103 of the public terminal 100 transmits a log of maintenance information about the recording apparatus 120 to the control center 200.

Figure 16:
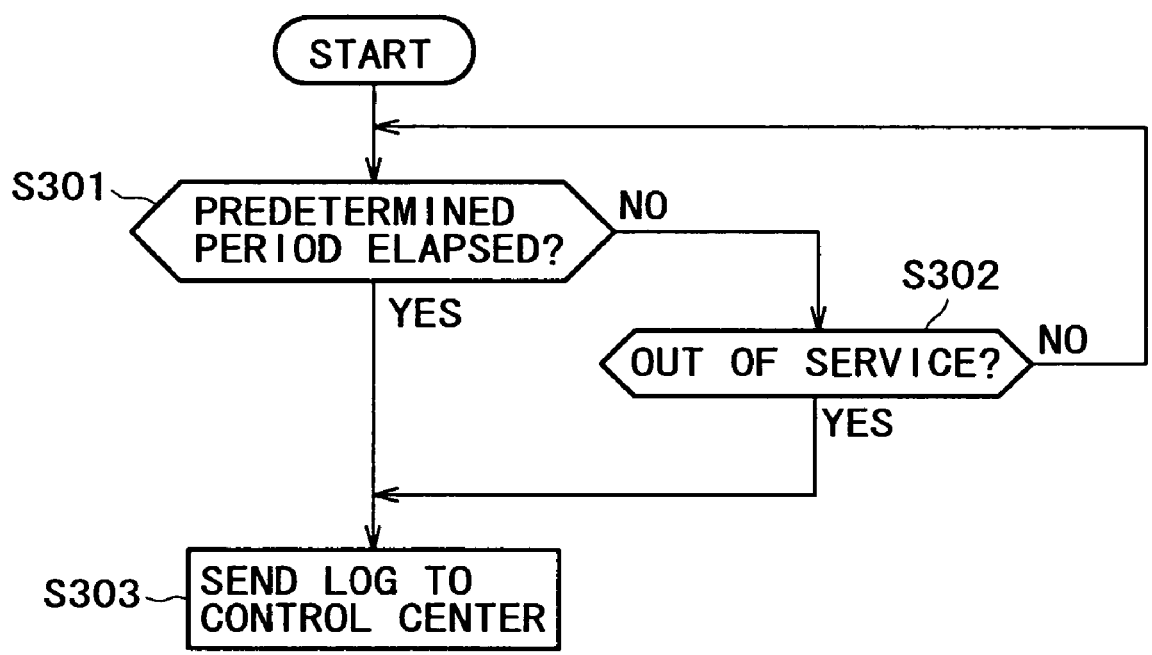
FIG. 16 is a flowchart of steps in which a log constituting maintenance information is transmitted to a control server.

In step S301 of FIG. 16, the control unit 103 determines periodically whether a predetermined time period (e.g., one week) has elapsed before sending an activity log of the recording apparatus 120 to the control server of the control center 200. If the predetermined period is found to have elapsed in step S301, step S303 is reached; if the predetermined period has yet to elapse, step S302 is reached. In step S302, the control unit 103 checks for received data indicating detection by the system controller 11 of a defect in the recording apparatus 120, i.e., the system controller 11 having withdrawn the recording apparatus 120 from service in step S239 of FIG. 15. If the recording apparatus 120 is found to be out of service, step S302 is reached; if no data have been received indicating a failed apparatus, step S301 is reached again.

In step S303, the control unit 103 transmits periodically an activity log to the control server of the control center 200 through the communication interface 105. The control unit 103 also sends data to the effect that the system controller 11 put the recording apparatus 120 out of service in step S239 of FIG. 15, as well as activity logs so far accumulated to the control server of the control center 200 through the communication interface 105.

When the control center 200 receives the activity logs from each public terminal 100 or the data to the effect that the system controller 11 withdrew the recording apparatus 120 from service in step S239 of FIG. 15, service personnel may be dispatched to the location where the public terminal 100 in question is installed. Maintenance work may then be carried out on the defective terminal in accordance with the reported status of the failed apparatus. In this manner, when a higher-than-normal error rate is reported from a faulty public terminal 100 to the control center of the control center 200, maintenance workers can be dispatched as soon as possible to service the terminal in question for write error prevention.

As another alternative, when the measured error rate falls between the first and the second threshold values (i.e., a range where a write error is not likely to occur yet), the public terminal 100 may transmit, in the background, error or warning information for write error prevention while letting target data be written to the magneto-optical disc 90a in the disc cartridge 90, the error or warning information representing illustratively the measured error rate or a degree of danger estimated from the error rate. More specifically, when the system controller 11 of the recording apparatus 120 writes the music data using the semiconductor laser output set on the second write level and with the measured error rate falling between the first and the second threshold values, the control unit 103 of the main processing unit 101 may transmit status data to the control server of the control center. The reported status is one in which the system controller 11 is predicted to withdraw the recording apparatus 120 from service in a short time. Reporting such status to the control center 200 allows the recording apparatus 120 in question to be maintained before the latter is put out of service, i.e., while the music data selling service is still being offered.

The error rate measuring function implemented in steps S104 through S107 of FIG. 14 has been used conventionally on production lines and at servicing sites and is incorporated as a service mode in the firmware of the recording apparatus 120. Basically, the public terminal 100 calls up an error rate measuring program constituting the service mode from the ROM 21 or other suitable storage illustratively at the time of music data recording. Executing the error rate measuring program implements the error rate measuring process shown in FIGS. 14 and 15. That is, the error rate measurement is brought about by utilizing the error rate measuring function of this service mode. This means that any addition to the firmware required by the invention is minimal and the design change involved is easy to accomplish.

In the description above with reference to FIGS. 14 through 16, the calibration check was shown performed when the user (i.e., customer) carried out operations to write music data to the magneto-optical disc 90a in the disc cartridge 90. Alternatively, the calibration check may be performed at other times, such as when a request is made for maintenance information, as will be described later. In that case, an error rate may be measured for inclusion into the maintenance information.

4. Maintenance Information 4-1. GET_MAINTENANCE_INFO

The public terminal 100 generates maintenance information and transmits the generated information to the control server of the control center 200. Through the communication network 300, the control server of the control center 200 collects maintenance information about the recording apparatus 120 from each of the numerous public terminals 100 at different locations for maintenance purposes. Illustratively, if a fault was detected in a music data write operation by a given public terminal 100, the maintenance information sent from that terminal to the control center 200 need only be analyzed to determine what caused the fault and to take appropriate countermeasures accordingly. What follows is a description of typical maintenance information to be transmitted from the public terminal to the control server.

The recording apparatus 120 and main processing unit 101 communicate with each other through an IEEE 1394 interface arrangement. The recording apparatus 120 transfers its maintenance information to the main processing unit 101 in a suitably timed manner and in an IEEE 1394 interface format. Given the maintenance information from the recording apparatus 120, the main processing unit 101 simply forwards the information to the control center 200 over the communication network 300. The IEEE 1394 interface format used here involves API commands provided as per IEEE 1394 interface criteria, the commands being used to send and receive maintenance information. One command defined under the IEEE 1394 interface standard is GET_MAINTENANCE_INFO for sending and receiving maintenance information about the recording apparatus 120.

The GET_MAINTENANCE_INFO command is implemented by utilizing a vender-dependent command, i.e., a command allowed by the vender to be added under API of IEEE 1394. The data structure of the GET_MAINTENANCE_INFO command as a vender-dependent command is explained below.

FIG. 17 shows in tabular form a typical structure of the GET_MAINTENANCE_INFO command. The structure in FIG. 17 represents a detailed content of the datafield in the write request packet (AV/C command packet) shown in FIG. 11.

A value of "0h" set in the four-bit CTS field and a value of "1h" in the four-bit ctype field of the GET_MAINTENANCE_INFO command indicate that this is also an AV/C status command. A value of "00h" is placed in the eight-bit opcode field to indicate that this is a vender-dependent command. A three-byte operand field subsequent to the opcode field accommodates operands [0] through [2], i.e., "08h," "00h" and "46h" respectively in this example, which constitute a company ID for uniquely identifying a given vender. The next four-byte field of operands [3] through [6] holds values defined by the vender (identified by the company ID) for operation purposes. Illustratively, the operand [3] stores a level of (F0h); the operands [4] and [5] accommodate a product code of (01h, 01h); and the operand [6] retains an application code of (01h).

An operand [7] and subsequent operands make up a substantial content of the GET_MAINTENANCE_INFO command. The operand [7] contains an opcode value for this vender-dependent command. In this example, a value of "30h" is set to represent the GET_MAINTENANCE_INFO command.

Items making up the maintenance information are placed successively from the operand [8] onward. The operands [8] and [9] constitute a Total_rec (H)/(L) field indicative of a total recording time. Of the 16 bits constituting a total recording time value, the high-order eight bits are placed in the (H) part of this field and the low-order eight bits in the (L) part. The distinction of the high-order (H) and low-order (L) parts may also be applied in other fields hereunder where appropriate. The total recording time is set in terms of hours to the Total_rec field, representing the time that has elapsed with the laser beam output set to "HIGH" (i.e., on the write level) for emission by the optical pickup 3. The actual recording time divided by double speed provides the elapsed recording time, i.e., the time during which the semiconductor laser was driven at the first and the second write levels. Also set in this field is the number of times the semiconductor laser was driven at the second write level. When that number of times has exceeded a predetermined count, the GET_MAINTENANCE_INFO command may be returned to the main processing unit 101 if so desired.

operands [10] and [11] constitute a Viop_ref (H)/(L) field. The value called Viop is a value that is used to monitor the laser output current during write operations. The Viop_ref field accommodates a value of Viop measured at the time of shipment from the factory. To execute a write operation requires outputting a laser beam on the first or the second write level, i.e., a laser output high enough to heat the disc signal surface up to the Curie temperature. That laser output is obtained by a laser output circuit block in the optical pickup providing a sufficiently large laser output current. The longer the time period during which the laser beam has been emitted, the greater the deterioration of the semiconductor laser in the optical pickup 3. It follows that the laser output circuit block is required to supply an increasingly larger output current (Viop) as the semiconductor laser progresses in its deterioration. The laser output current is placed under feedback control of an AGC (automatic gain control) circuit. When semiconductor degradation reaches a predetermined threshold level, it is deemed impossible for the semiconductor laser to produce a laser emission high enough to heat the magneto-optical disc 90a up to or higher than the Curie temperature; at this point, correct data recording is no longer guaranteed. In other words, the laser output circuit block involving laser diodes is subject to a physical service life. Checking the currently measured Viop value against the Viop_ref entry thus provides a rate of increase in the current which is indicative of how far the laser output circuit block has deteriorated. When the rate of increase in the laser output current exceeds the predetermined threshold level, that means the laser output circuit block is nearing the end of its service life and deemed ready to be replaced. In this manner, the Viop_ref field is used to determine the life of the laser output circuit block.

operands [12] and [13] constitute a Viop (H)/(L) field that contains a currently measured Viop value. If this value is yet to be determined, a value of "0000h" is returned.

operands [14] and [15] constitute a temperature (H)/(L) field that contains a value indicating the temperature inside the recording apparatus 120. In this example, a deviation from a reference temperature of 25° C. is given in hexadecimal notation. When a response is transmitted with this GET_MAINTENANCE_INFO command, twos compliment form data (16 bits) with reference to 25° C. as "0000h" are returned with this field. For example, $\Delta 10h = \Delta 0.71°$ C.

When the temperature is yet to be determined, a value of "0000h" (25° C.) is returned as temperature data.

operands [16] and [17] make up a voltage (H)/(L) field. This is a field that indicates a power voltage level supplied to this recording apparatus 120.

operands [18] and [19] constitute a Download_count [Request] (H)/(L) field. This is a field that accommodates the number of times the request to download music data was received illustratively from the control unit 103 of the main processing unit 101 in response to the customer's relevant operation. The phrase "download" herein means having the recording apparatus 120 write music data from the storage unit 104 to the magneto-optical disc 90a in the disc cartridge 90.

operands [20] and [21] make up a Download_count [Done] (H)/(L) field that holds the number of times the download was normally performed operands [22] and [23] constitute a Download_count[Cancel] (H)/(L) field that retains the number of times an ongoing download was canceled halfway. This is a value that is counted up when the download was interrupted in response to a DOWNLOAD_END(CANCEL) command coming illustratively from the main processing unit 101 over the data bus 23, or when some kind of trouble prompted the recording apparatus 120 to cancel the download halfway.

An operand [24] constitutes an Interrupt_Register[7-0] field. A Interrupt_Register value is placed into a register within an IC (integrated circuit) working as the IEEE 1394 interface 20 in the recording apparatus 120. This field accommodates information about data communications performed through the IEEE 1394 interface 20. The Interrupt_Register value is made up of eight bits, i.e., bit 7 through bit 0 holding the following information:
Bit 7: Cylst
  This indicates that with CycleMaster not in effect, CycleTimer has made two turns without a CycleStart packet being received.
Bit 6: CyAbFail
  This indicates that an attempt at arbitration for transmitting a CycleStart packet has failed.
Bit 5: Atrac Err
  This indicates detection of a discontinuous error in PES numbers upon ATRAC reception.
Bit 4: TxLate
  This indicates that an isochronous packet was late during transmission.
Bit 3: RxLack
  This indicates occurrence of a DBC discontinuity of isochronous packets.
Bit 2: IFEmpty
  This indicates that IsochronousFIFO has become empty.
Bit 1: IFFull
  This indicates that IsochronousFIFO has become full.
Bit 0: IsAbFail
  This indicates that an attempt at arbitration for transmitting an isochronous packet has failed.

In case a write error has occurred in the recording apparatus 120, bit 5 "Atrac Error" and bit 3 "RxLack" need only be checked. The settings of these two bits help to isolate the cause of the download (i.e., write) error. It should be noted that the settings of bit 5 "Atrac Error" and bit 3 "RxLack" are significant only if bit 1 "f_atrac_ifovf" in "emd_flg2", to be described later, is set to "0". The reason is that if an FIFO overflow occurs, data are destroyed and bit 1 "f_atrac_ifovf" f is set to "1".

An operand [25] constitutes an emd_flag2[7-0] field. As with the Interrupt_Register field, the emd_flag2[7-0] field represents information to be stored into the register of the IC (integrated circuit) serving as the IEEE 1394 interface 20. This field contains the following information:
Bit 7: not used
Bit 6: not used
Bit 5: not used
Bit 4: not used
Bit 3: not used
Bit 2: f_ts_error Interrupt Register[bit 14]
  This indicates that a "Transport Err Indicator" bit in a received ATRAC packet is set to "1".
Bit 1: f_atrac_ifovf Interrupt Register[bit 12]
  This indicates an FIFO overflow.
Bit 0: f_atrac_error Interrupt Register[bit 5]
  This indicates detection of a discontinuous error in PES numbers upon ATRAC reception.

The information above concerns the status of communication between the recording apparatus 120 and the main processing unit 101 through the IEEE 1394 interface. For this reason, referencing the bits in the information in terms of "emd_flag2" makes it possible at least to determine whether the write error is attributable to the recording apparatus 120 or to the main processing unit 101.

An operand [26] constitutes a state_flag[7-0] field. This is a field that accommodates information to be stored into an internal RAM by an IC chip working as the system controller 11 in the recording apparatus 120. At present, the field contains the following information:
Bit 7: not used
Bit 6: not used
Bit 5: not used
Bit 4: not used
Bit 3: not used
Bit 2: not used
Bit 1: not used
Bit 0: AUTO_EJECT
  AUTO_EJECT on: 1
  AUTO_EFECT off: 0

The public terminal 100 forcibly ejects an inserted disc cartridge 90 if no cartridge was requested specifically to be loaded for recording purchased music data in the write mode but a cartridge 90 has been inserted anyway through the cartridge slot 111. Generally the public terminal 100 offers various services other than the music data selling service as mentioned earlier. Where one of these other services is being offered, nothing is affected even if the disc cartridge 90 is inadvertently inserted into the terminal. However, the user may feel something is wrong with the terminal if the absent-mindedly inserted disc cartridge 90 has not been ejected and stays inside. Such an awkward situation is bypassed by an automatic disc cartridge ejection feature (called auto eject) that may be set to act if the disc cartridge 90 is inserted during a service other than the music data selling service. In the state_flag[7-0] field above, bit 0 "AUTO_EJECT" may be set to turn on or off the auto eject feature.

An operand [27] constitutes a retry_status_disp[7-0] field. This is a field that accommodates display information about error status leading to retries during write operations. The information is primarily concerned with the servo signal processing block in the recording apparatus 120.

Bit 7: f_retry_cannot_access
not used

Bit 6: f_retry_clv_unlock
This indicates a retry carried out when the spindle servo (speed servo, CLV servo) was unlocked.

Bit 5: f_retry_ivr
This indicates a retry performed when a variable resistance value of the RF amplifier exceeded its tolerance.

Bit 4: f_retry_focus
This indicates a retry executed when the focus servo was unlocked.

Bit 3: f_retry_din_unlock
not used

Bit 2: f_retry_address_error
This indicates a retry performed when the next ATIP (absolute time in pre-groove; address information detected from a wobble formed on a disc cartridge track) was not correct (NG).

Bit 1: f_retry_ader
This indicates a retry carried out when an ATIP read operation was not correct (NG).

Bit 0: f_retry_shock
This indicates a retry executed when a shock or other external disturbance was detected.

An operand [28] constitutes a rec_retry_count_sum field. This is a field that accommodates the number of times a retry was carried out as a result of an error during a write operation. In the case of a download error, the bits in the rec_retry_count_sum field are checked. If any one of the bits is not zero, then it is necessary to check the retry_status_disp [7-0] field. If every bit in the rec_retry_count sum field is zero, that means there never occurred a retry error in write operations and there is no need to check the retry_status_disp[7-0] field.

operands [29] and [30] constitute a serial_number (H)/(L) field. A serial number is an identifier that is assigned to each recording apparatus 120 for unique apparatus identification.

operands [31] and [32] make up a version_number (H)/(L) field. The program to be executed by the system controller 11 of the recording apparatus 120 is held illustratively in the ROM 21. This program can be updated as needed, and the version of the program is indicated by the number set in this version_number (H)/(L) field. Because the version number indicates the version of the current program, a malfunction attributable to a bug in the program of a specific version can be traced effectively when the version number is known.

operands [33] and [34] make up an error_rate (H)/(L) field. The value set in this field represents the error rate measured by the recording apparatus 120 in response to this maintenance information (GET_MAINTENANCE_INFO) command. For example, a maintenance-use disc cartridge 90 certified as normal may be loaded for error rate measurement, whereby the write performance of the recording apparatus 120 is measured in terms of error rates. In case a write error has occurred, the write error-related information is collected and analyzed by the control center 200. The analysis should help reveal that the download error is attributable to the loaded disc cartridge 90 or to the recording apparatus 120.

4-2. Maintenance Information Generating Process

The main processing unit 101 of the public terminal 100 acquires maintenance information from the recording apparatus 120 on suitable occasions or in an appropriately timed manner. In the public terminal 100, the main processing unit 101 is illustratively arranged to obtain maintenance information when the recording apparatus 120 has written user-selected music data to the magneto-optical disc 90a in the disc cartridge 90. The main processing unit 100 is also arranged illustratively to acquire maintenance information at predetermined intervals or at a fixed time or times of day from the recording apparatus 120 if the latter does not write music data for extended periods of time.

In order to obtain the maintenance information, the control unit 103 of the main processing unit 101 transmits the GET_MAINTENANCE_INFO command discussed above with reference to FIG. 17, to the IEEE 1394 interface 20 of the recording apparatus 120 through the IEEE 1394 interface 109. In other words, the main processing unit 101 sends to the recording apparatus 120 a request for acquiring the maintenance information. At this point, the operands [8] through [32] in the GET_MAINTENANCE_INFO command contain "FFh" each indicating that the information items are yet to be known.

On receiving the GET_MAINTENANCE_INFO command, the recording apparatus 120 sets relevant values to the fields of the operands [8] through [32] in accordance with internal information held in the ROM and in the internal registers of the IC chips configured, by controlling system controller 11. The collected information is returned as a response to the main processing unit 101. At this point, the CTS_ctype field in the response is set to "0Ch" (1100) indicating that this command is a response (IMPLEMENTED/STABLE) to a STATUS command.

The main processing unit 101 receives the GET_MAINTENANCE_INFO response through the IEEE 1394 interface 109. The response received here by the main processing unit 101 is converted illustratively into a file format under control of the control unit 103 before being transferred as a maintenance information file to the storage unit 104. The storage unit 104 has an area of a predetermined size allocated for use in maintaining the recording apparatus 120. The transferred maintenance information is written to that allocated area. The storage unit 104 always retains a plurality of sets of maintenance information ranging from a certain point in time in the past up to the present.

If the allocated area in the storage unit 104 is exhausted holding the past-to-present maintenance information, the control unit 103 stores the latest maintenance information into the allocated area by overwriting the oldest maintenance information. Whereas it is preferred for the storage unit 104 to retain all maintenance information ranging from a certain point in time in the past up to the present for maintenance purposes, it is allowed if so desired to hold only the maintenance information applicable at the time of a write error. The latter case of retaining the error-related maintenance information is sufficient in practice for the control center 200 to know past error status. This contributes to reducing the area allocated in the storage unit 104 for accommodating the maintenance information.

As described, the main processing unit 101 acquires maintenance information from the recording apparatus 120 and places it into the storage unit 104. More specifically, the main processing unit 101 transmits the GET_MAINTENANCE_INFO command to the recording apparatus 120. The recording apparatus 120 responds by returning the GET_MAINTENANCE_INFO response to the main processing unit 101. At this point, the recording apparatus 120 generates the response in the form of maintenance information. How the maintenance information is generated by the recording apparatus 120 will now be described in more detail.

Figure 18:
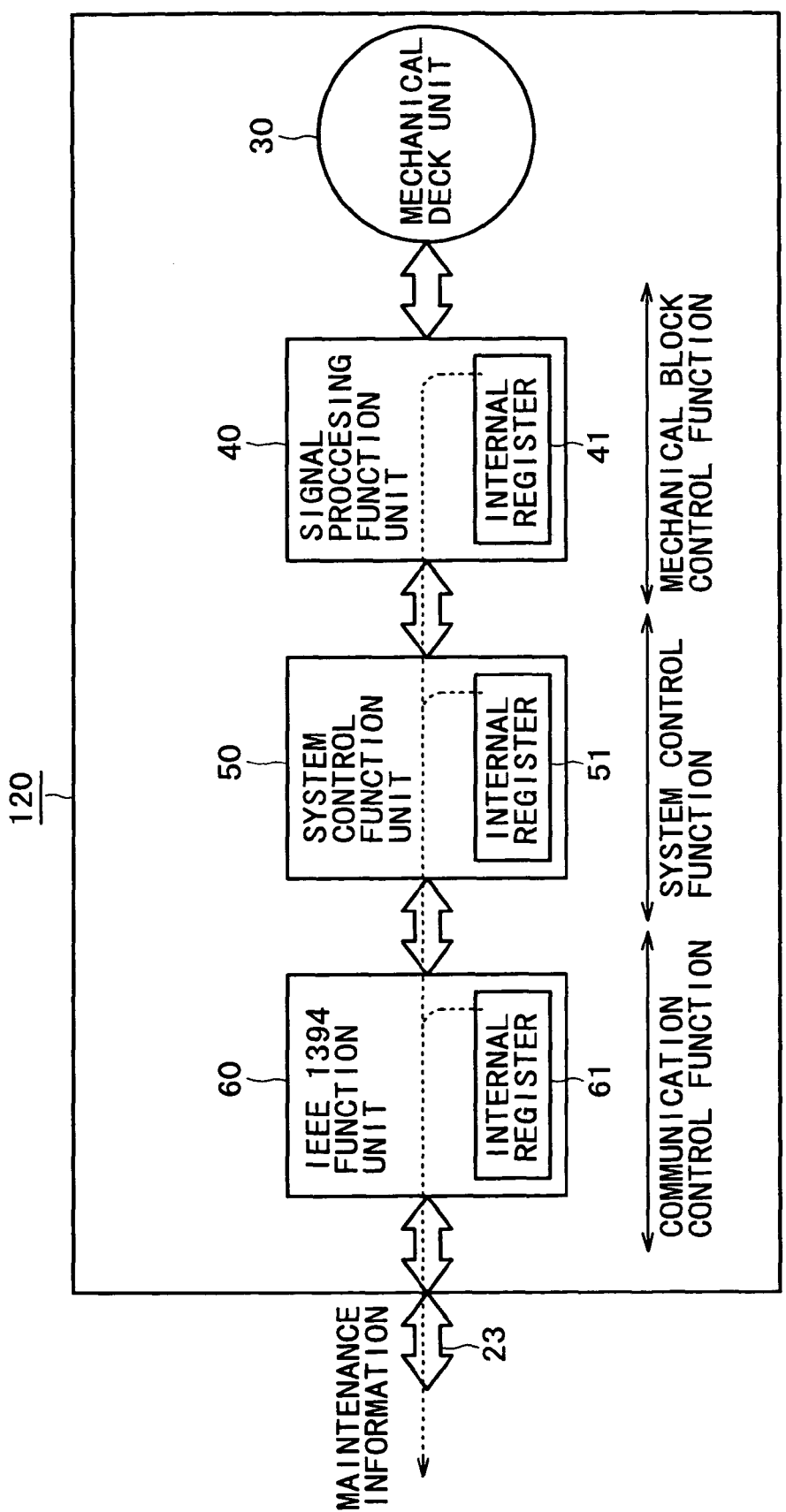
FIG. 18 is an explanatory view depicting how the GET_MAINTENANCE_INFO command is generated illustratively by the recording apparatus.

The recording apparatus 120 shown in FIG. 3 may be divided into a mechanical deck unit 30, a signal processing function unit 40, a system control function unit 50, and an IEEE 1394 function unit 60 from the viewpoint of generating maintenance information, as illustrated in FIG. 18.

The mechanical deck unit 30 comprises mechanical components such as: the spindle motor 2 for rotatably driving the magneto-optical disc 90a in the disc cartridge 90; the sled mechanism 5 for moving the optical block attached to the optical pickup 3, the objective lens drive mechanism 4, and the optical pickup 3 in the radial direction of the magneto-optical disc 90a; the loading mechanism for loading the disc cartridge 90 into the loading unit; and a hoisting and lowering mechanism for letting the magnetic head 6a advance into the disc cartridge 90 only upon write operation. The signal processing function unit 40 has drive circuits for driving the mechanical deck unit 30. Illustratively, the signal processing function unit 40 causes the spindle motor 2 to rotate the magneto-optical disc 90a at CLV or at CAV, and drives the semiconductor laser of the optical pickup 3 on the first or the second write level when writing music data. Furthermore, the signal processing function unit 40 supplements the music data to be written with the error-correction code and subjects the data to EFM processing. The system control function unit 50 is formed around the system controller 11 and controls the recording apparatus 120 as a whole. A signal processing circuit block (DSP: digital signal processor) for servo controls is also included in the system control function unit 50. The IEEE 1394 function unit 60 has communication control functions in compliance with IEEE 1394 interface criteria and corresponds to the IEEE 1394 interface 20.

The signal processing function unit 40, system control function unit 50, and IEEE 1394 function unit 60 with the exception of the mechanical deck unit 30 can each be implemented in an IC chip. The circuit operations depicted in FIG. 3 can be brought about by these IC chips working in collaboration. In the setup of FIG. 18, the signal processing function unit 40, system control function unit 50, and IEEE 1394 function unit 60 have internal registers 41, 51 and 61 respectively. The registers 41, 51 and 61 accommodate currently applicable values of the items making up the maintenance information. Specifically, the item values to be set to the operands [8] through [32] in the GET_MAINTENANCE_INFO response are always held in any one of the internal registers 41, 51 and 61.

FIG. 19 is a flowchart of steps in which the recording apparatus 120 transmits to the main processing unit 101 a GET_MAINTENANCE_INFO response generated on request from the main processing unit 101. The processing constituted by the steps outlined in FIG. 19 is carried out by the system controller 11. In step S401, the system controller 11 waits for a request for maintenance information output to arrive. More specifically, the system controller 11 waits for a GET_MAINTENANCE_INFO command to be sent from the main processing unit 101 over the data bus 23. On receiving the GET_MAINTENANCE_INFO command from the main processing unit 101, the system controller 11 goes to step S402. If a GET_MAINTENANCE_INFO command is not received, step S401 is repeated until the command is received.

In step S402, the system controller 11 carries out steps S101 through S104 in FIG. 14 to determine whether an error rate can be measured. More specifically, the system controller 11 checks to see whether the disc cartridge 90 has been loaded into the loading unit, whether the loaded disc cartridge 90 is writable, and whether the magneto-optical disc 90a has an available capacity large enough to accommodate the music data to be recorded. When these criteria are found to be met, step S403 is reached; if the criteria are not met, step S406 is reached.

In step S403, the system controller 11 measures the error rate, i.e., it performs the calibration check outlined in FIG. 15. After measuring the error rate, the system controller 11 goes to step S404 and retains the measured error rate. At this point, the measured error rate is set to the internal register of the system control function unit 50 shown in FIG. 18.

In step S405, the system controller 11 generates maintenance information. The internal register 41 of the signal processing function unit 40 shown in FIG. 18 holds, in terms of maintenance information items, current values of the information items related to the mechanical deck unit 30. Specifically, the information items regarding the mechanical deck unit 30 are "Total_rec," "Viop_ref," "Viop," "Temperature," and "Voltage," of which the values are set to the operands [8] through [17] in the GET_MAINTENANCE_INFO command shown in FIG. 17.

Figure 20:
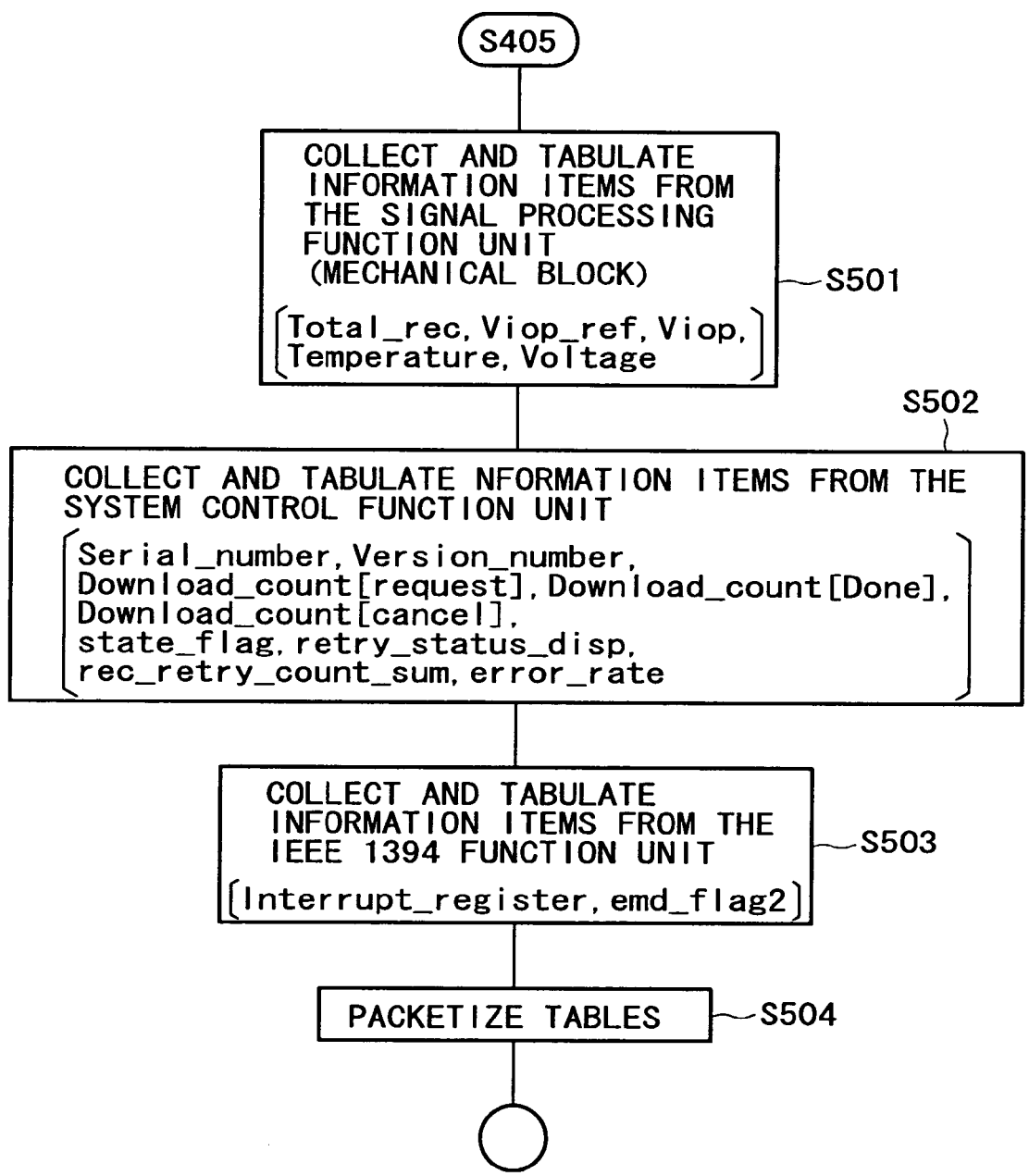
FIG. 20 is a flowchart of steps in which the recording apparatus generates maintenance information.

Described below with reference to FIG. 20 is a typical process of generating maintenance information. In step S501, the system controller 11 collects the information items from the internal register 41 and tabulates the collected items.

In step S502, the system controller 11 collects and tabulates current values of the items making up the maintenance information related to the system control function, the values being found in the internal register 51 of the system control function unit 50. The information items held in the internal register 51 are:

"Serial_number," "version_number,"

"Download_count[Request]," "Download_count[Done],"

"Download_count[Cancel]," "state_flag,"

"retry_status_disp," "rec_retry_count_sum," and

"error_rate." The "error_rate" item represents the error rate value acquired and retained in steps S403 and S404 of FIG. 19 explained above. Of the information items enumerated above, "Serial_number" and "version_number" are set to the operands [29] through [32] in GET_MAINTENANCE_INFO; "Download_count[Request],"

"Download_count[Done]" and "Download_count[Cancel]" are set to the operands [18] through [23]; and "state_flag,"

"retry_status_disp," "rec_retry_count_sum" are set to the operands [26] through [28]; and "error_rate" is set to the operands [33] and [34].

In step S503, the system controller 11 reads and tabulates in like manner information items from the internal register 61 of the IEEE 1394 function unit 60. Two items, "Interrupt_Register" and "emd_flg2," are found in the internal register 61. These items are set to the operands [24] and [25].

Carrying out steps S501, S502 and S503 generates three tables in which are written the contents of the registers 41, 51 and 61 of the signal processing function unit 40, system control function unit 50, and IEEE 1394 function unit 60 respectively. At this point, the information values to be placed in the operands [8] through [32] of GET_MAINTENANCE_INFO are held in one of the three tables.

In step S504, the three tables above are packetized. The system controller 11 generates a GET_MAINTENANCE_INFO response whose structure is shown in FIG. 17.

After generating the GET_MAINTENANCE_INFO response, the system controller 11 goes step S407 in FIG. 19.

In step S407, the system controller 11 transmits the GET_MAINTENANCE_INFO response to the main processing unit 101.

If in step S402 the error rate could not be measured, then the system controller 11 goes to step S406 and generates maintenance information with an invalid error rate. This information is then sent to the main processing unit 101. Illustratively, a predetermined invalid error rate value is set before the relevant table is generated in step S502.

The measurement of the error rate and the ejection of the disc cartridge from the recording apparatus 120 following the error rate measurement are implemented by the system controller 11 executing a suitable program held illustratively in the ROM 21. The control unit 103 of the main processing unit 101 is functionally implemented by executing an appropriate program in the storage unit 104. These programs may be retained on such removable storage media as flexible discs, a CD-ROM (compact disc read-only memory), an MO (magneto-optical) disc, a DVD (digital versatile disc), magnetic discs, or a semiconductor memory, temporarily or permanently. The programs may be retrieved from the medium as needed by the control unit 103 and system controller 11 and transferred to the ROM 21, storage unit 104, etc., for execution by the control unit 103 and system controller 11.

Although the description above contains many specificities, these should not be construed as limiting the scope of the invention but as merely providing illustrations of the presently preferred embodiments of this invention. For example, the invention may also be practiced as a recording/reproducing apparatus. In such a case, the maintenance information may include items reflecting reproduction status as well. The devices that measure an error rate and output the measured error rate are not limited to those compatible with the magneto-optical disc 90a in the disc cartridge 90; recording and/or reproducing apparatuses handling other storage media may also apply to the invention. Music data are not the only data to be written to the storage medium; video data involving moving pictures and sounds, still picture data, data files, or content data such as application software may also be written to the storage medium by the inventive setup. The public terminals 100 of this invention may also be those designed to provide some other services.

Where the recording and/or reproducing apparatus is installed illustratively in the public terminals for providing the music distribution service, the apparatus is liable to collect dust or other contamination on its objective lens or other sensitive components. Such contamination can disrupt the laser beam for recording use, often causing write data drop-outs or TOC destruction leading to data erasure or other serious defects. According to the invention, the recording apparatus writes and reads calibration data before actually writing data to the storage medium so as to measure the error rate at the calibration time, whereby a deficient write state can be predicted. If the degree of deficiency (i.e., error rate) is deemed reparable, the write operation is continued with the semiconductor laser power raised to a higher level as an emergency measure. Information is then sent to the host reporting that symptoms of failure are beginning to emerge. If the error rate is deemed irreparable, then the write and/or read operation is disabled in order to prevent occurrence of further error symptoms. Information is then sent immediately to the control center informing the latter of an urgent need for maintenance.

As described, the inventive system makes it possible not only to predict and prevent a possible failure of the recording and/or reproducing apparatus in each of the public terminals configured, but also to prompt the control center to indicate the need for maintenance of a faulty terminal based on the collected error information, and to estimate the degree of functional deterioration of each public terminal corresponding to the amount of dust or contamination in effect where the terminal is located, by counting the number of times the semiconductor laser has been adjusted in its output power intensity. The information gathered from these activities is used as a basis for determining the intervals at which each public terminal is maintained.

The present invention is not limited to the details of the above described preferred embodiments. The scope of the invention is defined by the appended claims and all changes and modifications as fall within the equivalence of the scope of the claims are therefore to be embraced by the invention.

What is claimed is:

1. A recording/reproducing apparatus for recording and reproducing data to and from an optical disc being loaded, said recording/reproducing apparatus comprising:

recording/reproducing means for recording and reproducing data to and from said optical disc by emitting a laser beam to recording tracks on the loaded optical disc;

transporting means for transporting said recording/reproducing means to a relevant recording track on said optical disc;

error rate detecting means for detecting an error rate of the data reproduced from said optical disc; and laser beam intensity controlling means for controlling in intensity said laser beam emitted to said optical disc in accordance with said error rate resulting from the detection by said error rate detecting means, wherein said laser beam intensity controlling means has a first and a second threshold value, said first threshold value being used to determine whether said error rate detected by said error rate detecting means is at a normal level, said second threshold value being used to determine whether said error rate is at an irreparable level; and wherein, if said error rate is found falling between said first and said second threshold values, said laser beam intensity controlling means raises the intensity of said laser beam to a level higher than the intensity in effect when said error rate is smaller than said first threshold value.

2. The recording/reproducing apparatus according to claim 1, wherein, if said error rate detected by said error rate detecting means is smaller than said first threshold value, said laser beam intensity controlling means enables said recording/reproducing means to record and reproduce the data to and from said optical disc.

3. The recording/reproducing apparatus according to claim 1, wherein, if said error rate detected by said error rate detecting means exceeds said second threshold value, said laser beam intensity controlling means disables said recording/reproducing means from recording the data to said optical disc being loaded.

4. The recording/reproducing apparatus according to claim 1, wherein said error rate detecting means detects said error rate by recording and reproducing calibration data to and from said optical disc after said transporting means has transported said recording/reproducing means to a relevant recording track.

5. A recording/reproducing apparatus for recording and reproducing data to and from an optical disc being loaded, said recording/reproducing apparatus comprising:

optical disc loading/ejecting means for transporting said optical disc between a first position in which the data is record and reproduced to and from said optical disc, and a second position in which said optical disc is ejected;

recording/reproducing means for recording and reproducing the data by emitting a laser beam to a recording track on said optical disc;

transporting means for transporting said recording/reproducing means in such a manner that said laser beam is emitted to a relevant recording track on said optical disc;

error rate measuring means for measuring an error rate of the data reproduced by said recording/reproducing means;

laser beam intensity controlling means for controlling in intensity said laser beam emitted to said optical disc; and controlling means for causing said error rate measuring means to measure the error rate of the data read by said recording/reproducing means from said optical disc loaded by said optical disc loading/ejecting means, said controlling means further causing said laser beam intensity controlling means to change the intensity of said laser beam in accordance with said error rate resulting from the measurement by said error rate measuring means, wherein said controlling means has a first and a second threshold value, said first threshold value being used to determine whether said error rate measured by said error rate measuring means is at a normal level, said second threshold value being used to determine whether said error rate is at an irreparable level; and wherein, if said error rate is found falling between said first and said second threshold values, said controlling means controls said laser beam intensity controlling means to raise the intensity of said laser beam to a level higher than the intensity in effect when said error rate is smaller than said first threshold value.

6. The recording/reproducing apparatus according to claim 5, wherein, if said error rate measured by said error rate measuring means is smaller than said first threshold value, said controlling means enables said recording/reproducing means to record and reproduce the data to and from said optical disc.

7. The recording/reproducing apparatus according to claim 5, wherein, if said error rate detected by said error rate detecting means exceeds said second threshold value, said controlling means disables said recording/reproducing means from recording the data to said optical disc.

8. The recording/reproducing apparatus according to claim 7, wherein said controlling means causes said optical disc loading/ejecting means to eject to said second position said optical disc onto which the recording has been disabled.

9. The recording/reproducing apparatus according to claim 7, further comprising signaling means for signaling that the recording onto said optical disc has been disabled.

10. The recording/reproducing apparatus according to claim 5, further comprising communicating means for communicating data with an external apparatus;

wherein said controlling means causes said communicating means to transmit to said external apparatus said error rate resulting from the measurement by said error rate measuring means.

11. The recording/reproducing apparatus according to claim 5, wherein said error rate measuring means measures said error rate by recording and reproducing calibration data to and from said optical disc after said transporting means has transported said recording/reproducing means to a relevant recording track.

12. The recording/reproducing apparatus according to claim 5, further comprising storing means for storing content to be recorded to said optical disc being loaded.

13. The recording/reproducing apparatus according to claim 5, further comprising receiving means for receiving content from an external apparatus so that the received content may be recorded to said optical disc.

14. A recording/reproducing method for recording and reproducing data to and from an optical disc, said recording/reproducing method comprising the steps of:

transporting an optical head to a relevant recording track on said optical disc so that said optical head may emit a laser beam to said recording track;

recording relevant data to said recording track to which said optical head has been transported;

reproducing the recorded relevant data;

measuring an error rate of the reproduced data;

controlling in intensity said laser beam emitted to said optical disc at a time of recording in accordance with the measured error rate; and comparing said measured error rate with a first and a second threshold value, said first threshold value being used to determine whether said measured error rate is at a normal level. said second threshold value being used to determine whether said measured error rate is at an irreparable level, wherein, if said measured error rate is found smaller than said first threshold value, said laser beam intensity controlling step enables recording and reproduction of the data to and from said optical disc.

15. The recording/reproducing method according to claim 14, wherein, if said measured error rate is found falling between said first and said second threshold values, said laser beam intensity controlling step raises the intensity of said laser beam to a level higher than the intensity in effect when said error rate is smaller than said first threshold value.

16. The recording/reproducing method according to claim 14, wherein, if said measured error rate is found to exceed said second threshold value, said laser beam intensity controlling step disables recording of the data to said optical disc.

17. The recording/reproducing method according to claim 16, further comprising the step of:

signaling that the recording of the data has now been disabled if the recording of the data to said optical disc is disabled.

* * * * *